United States Patent
Albert et al.

(10) Patent No.: US 6,626,056 B2
(45) Date of Patent: Sep. 30, 2003

(54) ELECTRONIC-HYDRAULIC CONTROL DEVICE FOR TRANSMISSION OF VEHICLES, PREFERABLY OF MOTOR VEHICLES

(75) Inventors: Roland Albert, Regensburg (DE); Roland Meyer, Roth (DE); Karl Smirra, Wasserburg (DE); Michael Ulm, Alteglofsheim (DE); Andreas Wild, Unterensingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/010,001

(22) Filed: Nov. 13, 2001

(65) Prior Publication Data

US 2002/0062714 A1 May 30, 2002

Related U.S. Application Data

(63) Continuation of application No. PCT/DE00/01484, filed on May 11, 2000.

(30) Foreign Application Priority Data

May 11, 1999 (DE) ......................................... 199 21 535
Oct. 19, 1999 (DE) ......................................... 199 50 443

(51) Int. Cl.$^7$ ............................................. F16H 57/02
(52) U.S. Cl. ...................................... 74/335; 74/606 R
(58) Field of Search ............................... 74/335, 606 R, 74/DIG. 1, 336 R

(56) References Cited

U.S. PATENT DOCUMENTS

| | | | | |
|---|---|---|---|---|
| 3,876,028 A | * | 4/1975 | Asano et al. ............... 180/336 |
| 4,499,789 A | | 2/1985 | Kuramochi et al. ........... 74/740 |
| 4,527,580 A | * | 7/1985 | Chheda ........................ 137/1 |
| 5,050,447 A | * | 9/1991 | Hayakawa et al. ........... 74/467 |
| 5,144,801 A | * | 9/1992 | Scanderbeg et al. .......... 60/475 |
| 5,164,625 A | * | 11/1992 | Hofmann et al. ............. 310/71 |
| 5,197,507 A | * | 3/1993 | Miki et al. ...................... 137/1 |
| 5,417,124 A | | 5/1995 | Huff et al. ..................... 74/335 |
| 5,709,134 A | | 1/1998 | Ulm ........................... 74/606 R |
| 5,749,060 A | | 5/1998 | Graf et al. ...................... 701/51 |
| 5,842,753 A | | 12/1998 | Staib et al. ............... 303/119.3 |
| 5,895,027 A | * | 4/1999 | Yagi ........................... 137/560 |
| 6,202,699 B1 | * | 3/2001 | Meyer et al. ................. 137/884 |
| 6,205,887 B1 | * | 3/2001 | Barnreiter et al. ............ 74/335 |
| 6,227,333 B1 | * | 5/2001 | Scheib et al. ............... 184/6.12 |

FOREIGN PATENT DOCUMENTS

| | | | |
|---|---|---|---|
| DE | 44 15 133 C1 | 6/1995 | |
| DE | WO 96/16464 | * 5/1996 | ........... H02K/5/128 |
| DE | 197 32 474 A 1 | 2/1999 | |
| DE | 197 56 639 A 1 | 6/1999 | |
| EP | 0 872 396 A2 | 10/1998 | |
| EP | 0 926 351 A2 | 6/1999 | |

OTHER PUBLICATIONS

International Search Report for PCT/DE00/01484, issued by the European Patent Office on Sep. 13, 2000.

* cited by examiner

*Primary Examiner*—Sherry Estremsky
*Assistant Examiner*—Tisha D. Lewis
(74) *Attorney, Agent, or Firm*—Laurence A. Greenberg; Werner H. Stemer; Ralph E. Locher

(57) ABSTRACT

An electronic-hydraulic control device for gearboxes of vehicles, preferably motor vehicles, includes a housing in which an electronic unit for controlling magnetic valves is accommodated. The valves are supplied with a pressure medium. The housing has a magnetic housing part in which magnetic parts of the magnetic valves and the electronic unit of the control device are accommodated and which lies outside the gearbox, and a hydraulic housing part in which hydraulic parts of the magnetic valves are located and which is positioned at least partially inside the gearbox housing.

73 Claims, 21 Drawing Sheets

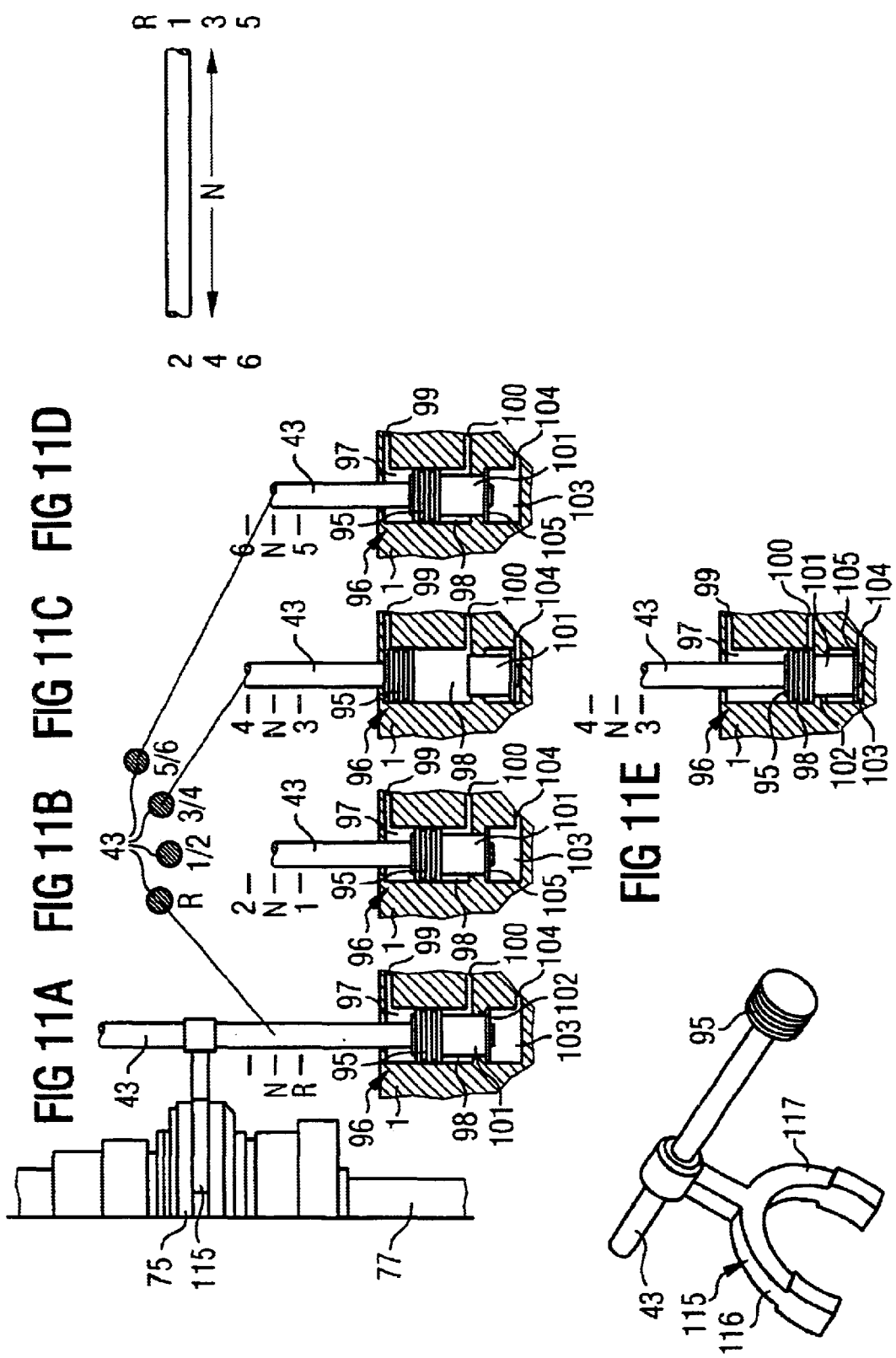

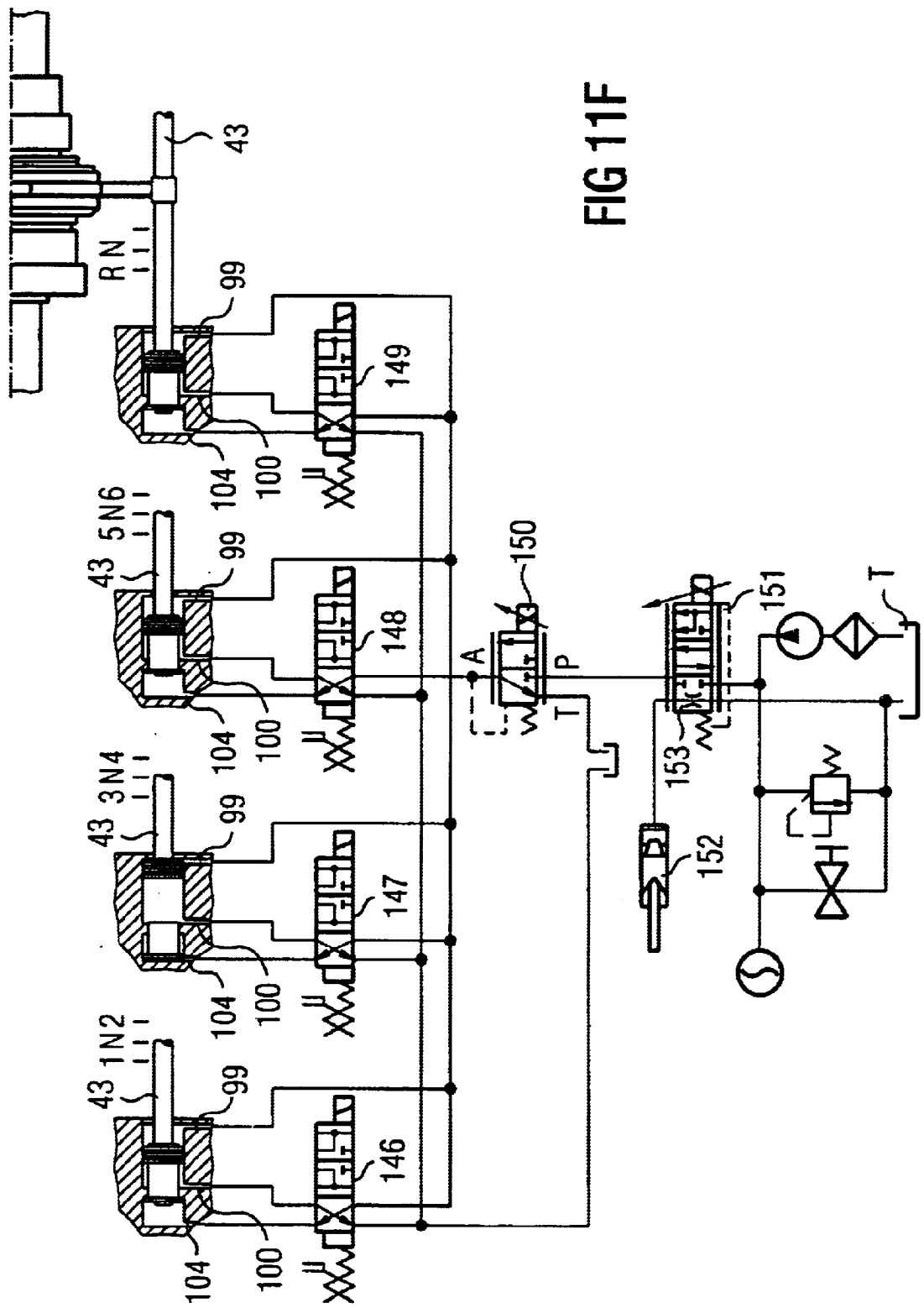

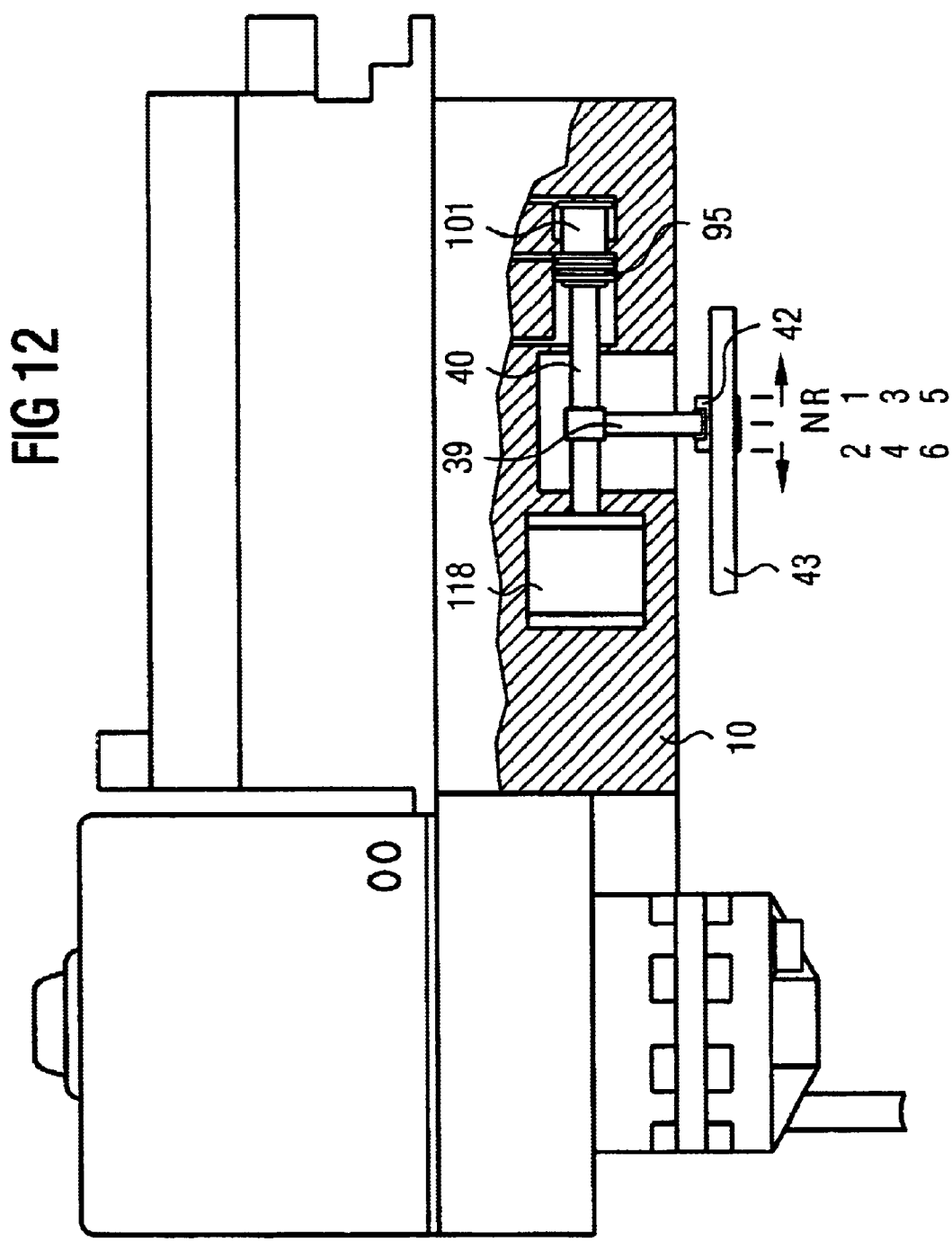

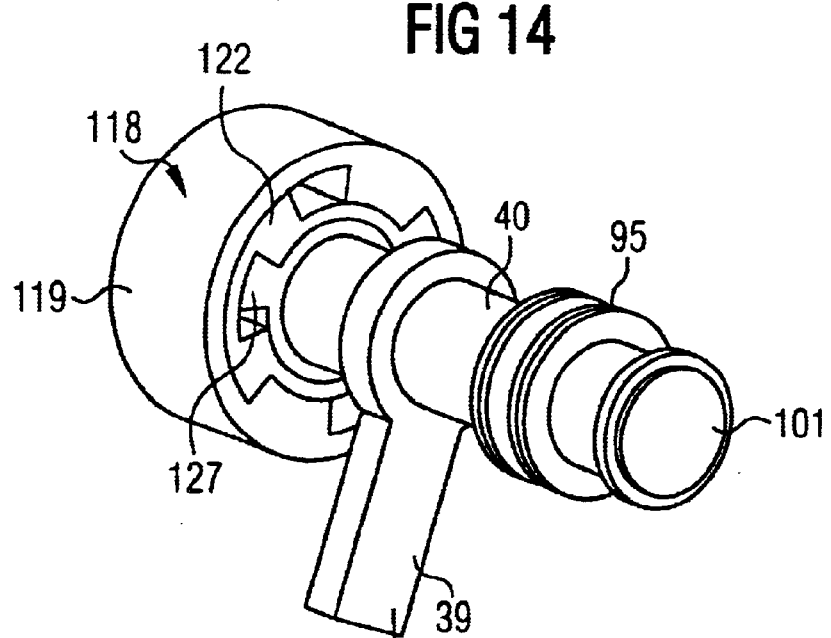
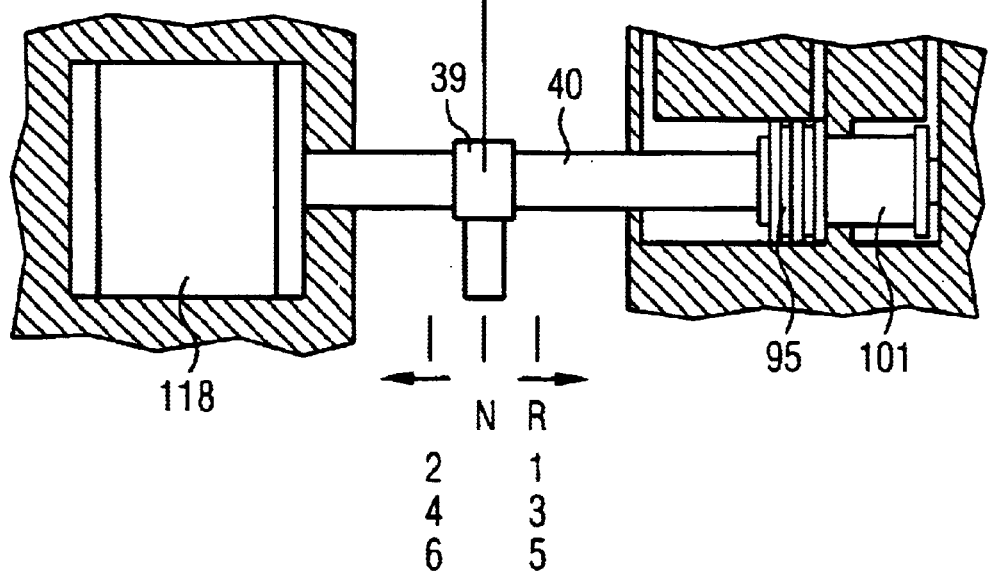

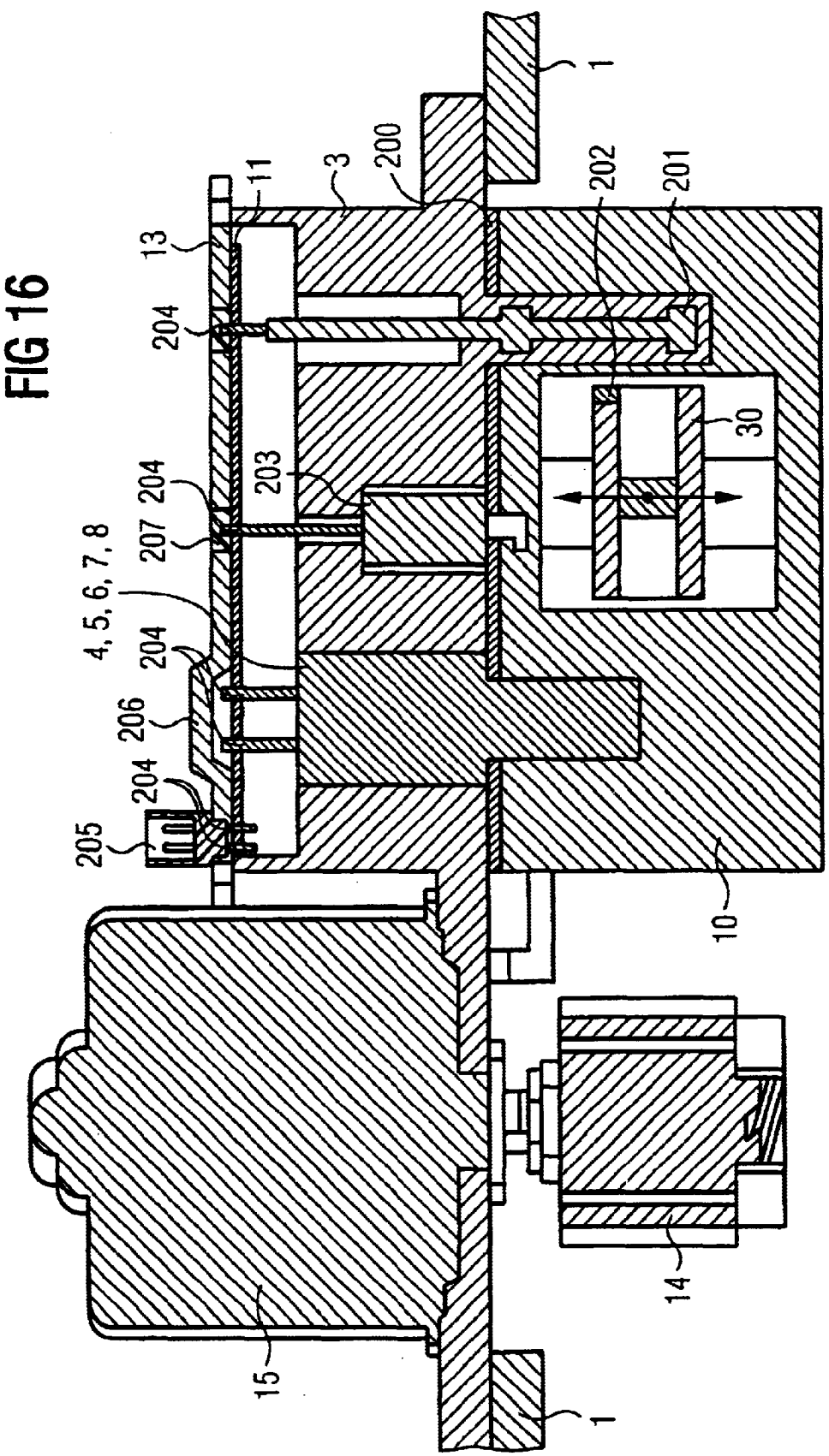

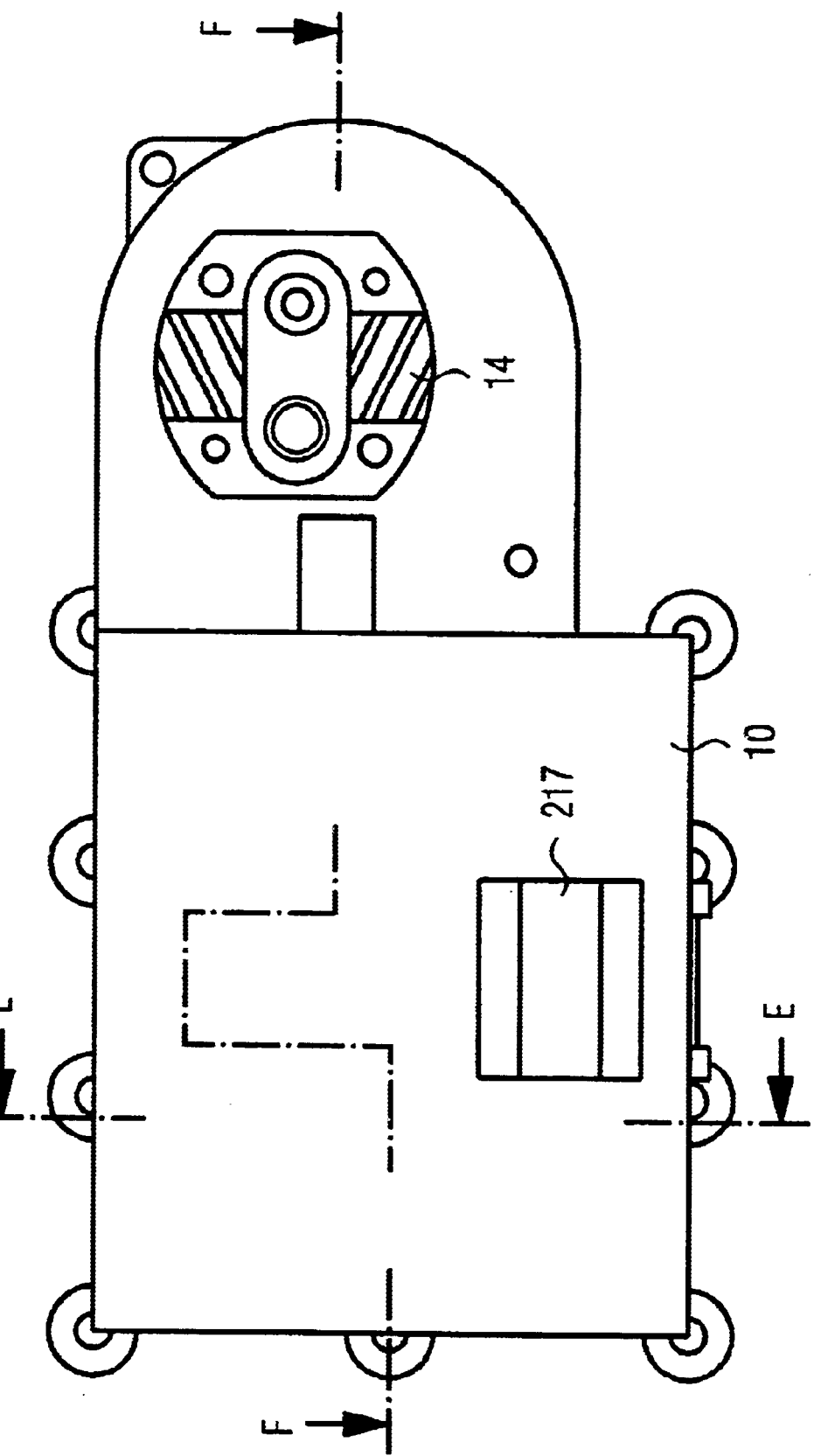

# ELECTRONIC-HYDRAULIC CONTROL DEVICE FOR TRANSMISSION OF VEHICLES, PREFERABLY OF MOTOR VEHICLES

CROSS-REFERENCE TO RELATED APPLICATION

This application is a continuation of copending International Application No. PCT/DE00/01484, filed May 11, 2000, which designated the United States.

BACKGROUND OF THE INVENTION

Field of the Invention

The invention relates to an electronic-hydraulic control device for transmissions of vehicles, preferably, of motor vehicles.

In the control device disclosed in U.S. Pat. No. 5,709,134 to Ulm, only electrical and electronic components, but no mechanical or hydraulic control elements, are integrated in the control device. The mechanical or hydraulic control elements are situated in a valve block, which is installed in the automatic transmission of a motor vehicle. The control device is fitted onto valve domes of the valve block in which armatures actuated by the solenoid valves are located.

U.S. Pat. No. 5,749,060 to Graf et al. relates to a control device for an automatic transmission with solenoid valves, which is likewise placed onto valve domes of a valve block. The valve domes project through the transmission casing and into the casing of the control device. The control device is located completely outside the transmission casing.

In an automated manual transmission, the control device is used to select the appropriate gate arm in an automated manual transmission and to engage the desired gear in the selected gate arm. The gear selector provided for such a purpose is flanged onto the transmission. The hydraulic and mechanical actuating elements of the gear selector are located outside the transmission casing. To carry out a gear change, the corresponding gearshift shaft of the transmission is shifted from the outside. An external pressure supply is provided for the gear selector. The gear selector is connected for pressure supply purposes through hydraulic lines. The control lines are correspondingly long. There is a large number of contact points, for example, plug-in or soldered connections, which leads to a high probability of failure or to a high potential for the control device to fail. Because the hydraulic components are located outside the transmission casing, complex measures are required to prevent leakage and to protect against damage to components, which are acted on by pressure, for example, a crash protection for oil tanks.

Furthermore, a complex sealing configuration is required. High-strength, heavy connecting lines are required to connect the individual components of the control device. Partly because of the long line distances, they are susceptible to faults and require expensive measures to shield against radio interference. Because the control device includes a large number of components, it can only be produced and assembled at high cost. Moreover, the large number of components makes the control device heavy. Optimum utilization of space is impossible because of the large number of components.

SUMMARY OF THE INVENTION

It is accordingly an object of the invention to provide an electronic-hydraulic control device for transmissions of vehicles, preferably of motor vehicles, that overcomes the hereinafore-mentioned disadvantages of the heretofore-known devices of this general type and that, with a structurally simple and compact configuration, has a long service life, can be assembled without problems, and has only a low susceptibility to faults. Preferably, the vehicle transmission is a motor vehicle transmission.

With the foregoing and other objects in view, there is provided, in accordance with the invention, an electronic-hydraulic control device for a vehicle transmission having a transmission casing with an installation opening, solenoid valves with magnet parts and hydraulic parts, electronics for controlling the solenoid valves, and a pressure medium, the control device including a casing having a magnet casing part accommodating the electronics and the magnet parts of the solenoid valves, and a hydraulics casing part to be disposed at least partially within the transmission casing, to be supplied with the pressure medium, accommodating the hydraulic parts of the solenoid valves, and to be installed in the installation opening of the transmission casing. Alternatively, the hydraulics casing part is disposed at least partially within the transmission casing, is supplied with the pressure medium, and is installed in the installation opening of the transmission casing.

In the control device according to the invention, the magnetic parts of the solenoid valves are located in the magnet casing part, which is located outside the transmission casing. The electronics of the control device are also located outside the transmission casing in the magnet casing part. Consequently, there are only minor thermal loads acting on these sensitive components of the control device. Thus, the control device according to the invention operates reliably. The hydraulic parts of the solenoid valves are accommodated in the hydraulics casing part, which is located at least partially inside the transmission casing. Consequently, any leakage that occurs can flow directly into the transmission casing. As such, the need for complex seals is eliminated.

In accordance with another feature of the invention, the vehicle transmission has a pump with a motor for pumping the pressure medium and the hydraulics casing part has a shoulder to be attached to or is attached to the pump and the motor.

In accordance with a further feature of the invention, the shoulder has opposite sides and the pump and the motor are to be attached to or are attached to respective ones of the opposite sides.

In accordance with an added feature of the invention, the pump is disposed within the transmission casing.

In accordance with an additional feature of the invention, the motor projects out of the transmission casing.

In accordance with yet another feature of the invention, the vehicle transmission has a reservoir for holding the pressure medium.

In accordance with yet a further feature of the invention, the reservoir is integrated in the control device or in the casing or is accommodated within the hydraulics casing part.

In accordance with yet an added feature of the invention, the casing or the hydraulics casing part defines a receiving space, the reservoir has a bellows element, and the bellows element is accommodated within the receiving space.

In accordance with yet an additional feature of the invention, the bellows element is filled with air.

In accordance with again another feature of the invention, the reservoir has a piston for prestressing or pressurizing the pressure medium.

In accordance with again a further feature of the invention, the transmission casing has a spring and the spring imparts a force upon the piston.

In accordance with again an added feature of the invention, a plug connector is to be connected to or is connected to the motor.

In accordance with again an additional feature of the invention, the plug connector is to be disposed or is disposed inside the transmission casing.

In accordance with still another feature of the invention, a gear selector is disposed within the hydraulics casing part.

In accordance with still a further feature of the invention, the gear selector is to be actuated or is actuated by at least one of the solenoid valves.

In accordance with still an added feature of the invention, the vehicle transmission has shifting sleeves and the control device is to be used to hydraulically activate the shifting sleeves.

In accordance with still an additional feature of the invention, the shifting sleeves each have two pressure chambers and a pressure line is connected to each of the two pressure chambers.

In accordance with another feature of the invention, the vehicle transmission has transmission shafts and the pressure line is a bore in a respective one of the transmission shafts.

In accordance with a further feature of the invention, the vehicle transmission has pistons each accommodated within a respective one of the pressure chambers.

In accordance with an added feature of the invention, the pistons are identically configured and are disposed mirror-symmetrically with respect to one another.

In accordance with an additional feature of the invention, a mating stop is disposed in each of the shifting sleeves and the pistons are each assigned the mating stop for defining a limit position.

In accordance with yet another feature of the invention, the vehicle transmission has hydraulically displaceable gearshift shafts.

In accordance with yet a further feature of the invention, one of the pistons is positioned on each of the gearshift shafts.

In accordance with yet an added feature of the invention, the piston separates a pressure chamber into two partial pressure chambers each separated from one another.

In accordance with yet an additional feature of the invention, a pressure line opens into each of the two partial pressure chambers.

In accordance with again another feature of the invention, a stop is assigned to each of the pistons of the gearshift shafts.

In accordance with again a further feature of the invention, the stop is a piston to be acted on by pressure.

In accordance with again an added feature of the invention, the stop is to be displaced into a stop position under action of pressure.

In accordance with again an additional feature of the invention, the stop has piston surfaces and one of the piston surfaces remote from the gearshift shaft is larger than an opposite one of the piston surfaces.

In accordance with still another feature of the invention, at least one pressure line opens into the pressure chamber accommodating the stop.

In accordance with still a further feature of the invention, the vehicle transmission includes a gearshift fork for each of the gearshift shafts and each of the gearshift shafts is coupled, through a respective gearshift fork, to the shifting sleeves of the corresponding transmission shafts.

In accordance with still an added feature of the invention, the vehicle transmission includes actuators, gate arms, and gears and each of the gearshift shafts is to be rotated about an axis by one of the actuators to select one of a gate arm and a gear.

In accordance with still an additional feature of the invention, each of the actuators has an outer rotary piston and an inner rotary piston and the outer and inner rotary pistons rotate to a given extent with respect to one another.

In accordance with another feature of the invention, each of the gearshift shafts is connected in a rotationally fixed manner to the inner rotary piston.

In accordance with a further feature of the invention, each of the gearshift shafts is axially displaceable with respect to the inner rotary piston.

In accordance with an added feature of the invention, the vehicle transmission includes actuating devices each having a gearshift element and a rotary actuator and each of the gearshift shafts is to be coupled to a respective gearshift element.

In accordance with an additional feature of the invention, the actuating devices each have a shaft bearing the respective gearshift element and rotating with the respective rotary actuator.

In accordance with yet another feature of the invention, the hydraulics casing part is attached to the transmission casing.

In accordance with yet a further feature of the invention, the magnet casing part is formed of a nonconductive material.

In accordance with yet an added feature of the invention, a metal cover is connected to the casing.

In accordance with yet an additional feature of the invention, an electronics panel is attached to the cover.

In accordance with again another feature of the invention, a displacement sensor configuration is disposed within the magnet casing part.

In accordance with a concomitant feature of the invention, a pressure sensor configuration is disposed within the magnet casing part.

Other features that are considered as characteristic for the invention are set forth in the appended claims.

Although the invention is illustrated and described herein as embodied in an electronic-hydraulic control device for transmissions of vehicles, preferably of motor vehicles, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIGS. 11a to 11e are fragmentary, cross-sectional views of various shifting positions during shifting of the transmission for another embodiment according to the invention;

FIG. 11f is a partial schematic circuit diagram and a partial, fragmentary, cross-sectional view of another embodiment of a control device according to the invention;

FIG. 12 is a fragmentary, partially cross-sectional view of a detail of the control device according to the invention;

FIG. 13 is a fragmentary, enlarged, cross-sectional view of a detail of the control device of FIG. 12;

FIG. 14 is a perspective view of a shaft with an actuator of the control device of FIG. 12;

FIG. 16 is a fragmentary, cross-sectional view of a further embodiment of the control device according to the invention;

FIG. 21 is an elevational view from below of a further embodiment of a control device according to the invention.

DESCRIPTION OF THE PREFERRED EMBODIMENTS

The electronic-hydraulic control device described below is provided for automated manual transmissions of vehicles, preferably of motor vehicles. The control device can be used generally for transmissions, including, for example, for double-clutch transmissions.

Figure 1:
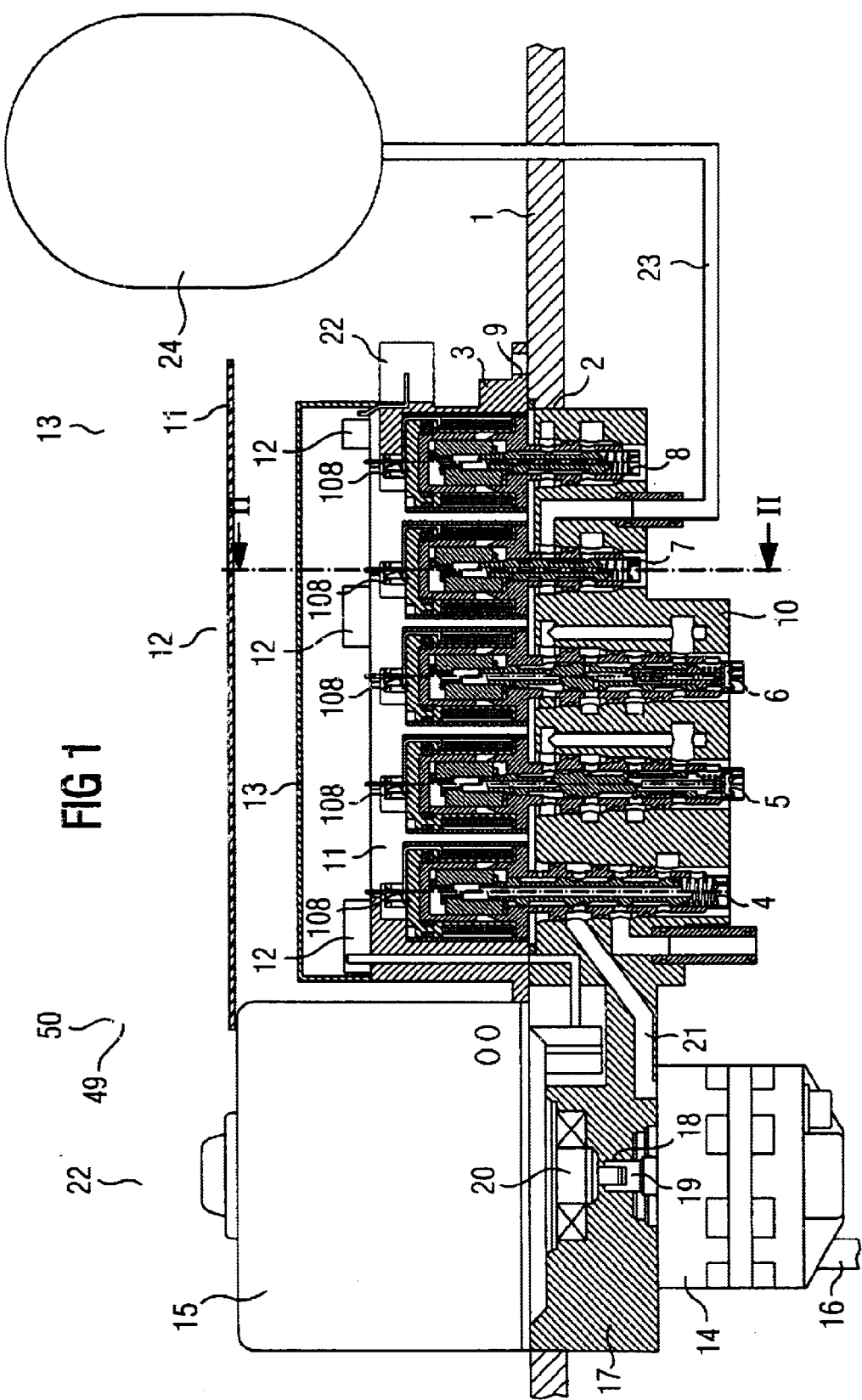
FIG. 1 is a fragmentary, partially cross-sectional view of a control device according to the invention.
Figure 2:
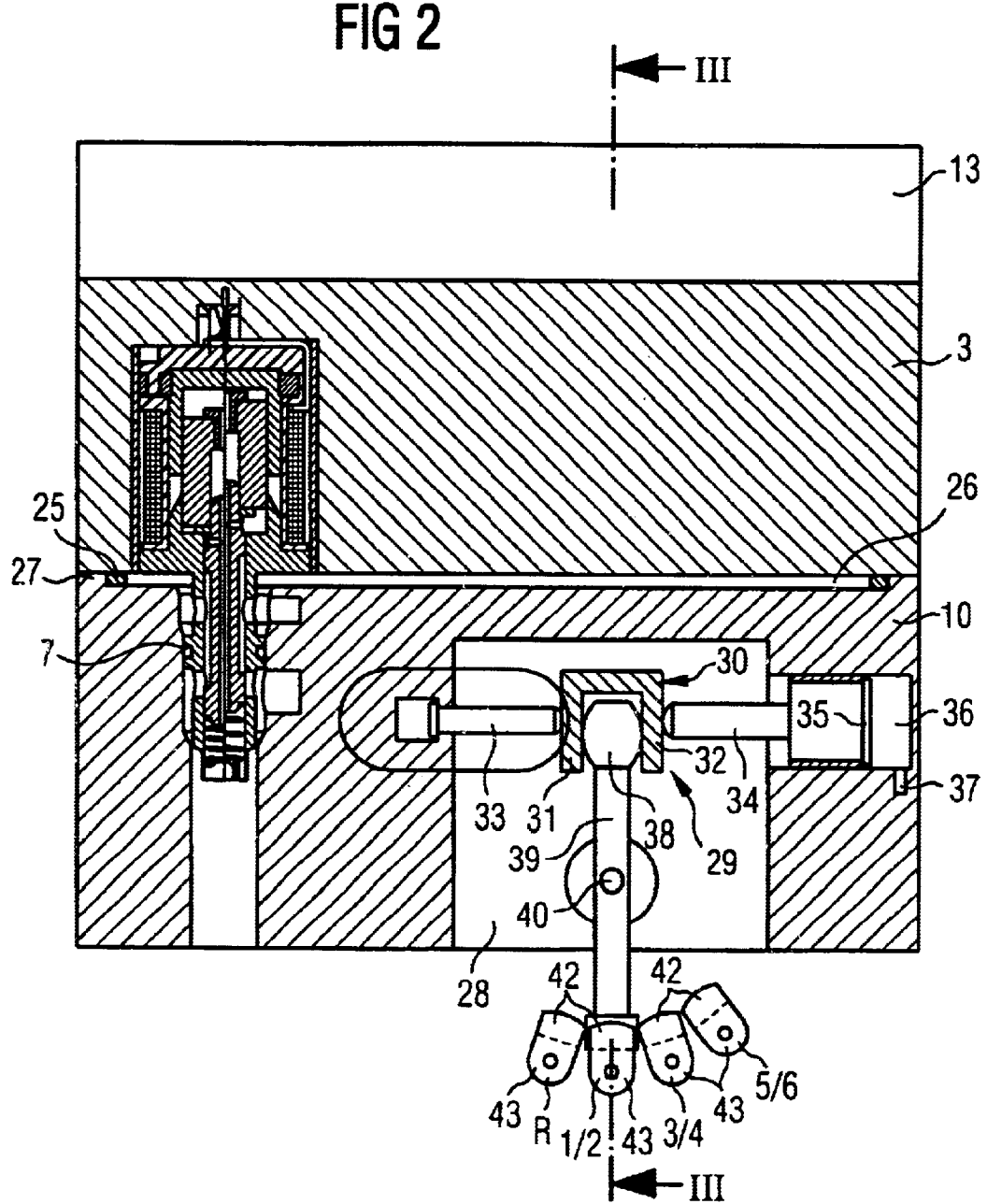
FIG. 2 is a fragmentary, cross-sectional view of a section taken across line II—II in FIG. 1.

Referring now to the figures of the drawings in detail and first, particularly to FIG. 1 thereof, there is shown a part of the transmission casing 1 in which the non-illustrated manual transmission is located. The transmission casing 1 has an installation opening 2 for the control device. The casing 1 has a magnet casing 3 in which solenoid valves 4 and 8 are accommodated. The magnet casing 3 bears, through a flange 9, on the transmission casing 1 and is attached thereto in a sealed manner. The solenoid valve 4 is a clutch valve that can be used to actuate one or more clutches. The valves 5 and 6 are used to engage the appropriate gear of the manual transmission, while the solenoid valves 7, 8 are used to select the gate arm of the transmission. Therefore, the valves 5 to 8 activate the gear selector 29 (FIG. 2). The solenoid valves 5, 6 are constructed as proportional solenoid valves, while on-off valves are used for the solenoid valves 7, 8. The valve 4 is likewise a proportional solenoid valve.

A hydraulics casing 10, which is connected sealingly to the magnet casing 3 located outside the transmission casing 1, of the control device projects through the installation opening 2 of the transmission casing 1. On the magnet casing 3 there is an electronics panel 11, on which the electrical and/or electronic components 12 required for operation of the control device are accommodated. A cover 13, which covers the electronics panel 11 together with the components 12, is supported on the magnet casing 3.

The construction of the solenoid valves 4 to 8 is conventional and, consequently, does not require a more detailed description. Depending on the position of the various solenoid valves, the clutch is actuated, the gear is engaged in the manual transmission, or the appropriate gate arm of the transmission is selected. Magnet parts actuate the solenoid valves 4 to 8.

The hydraulic medium is delivered by a pump 14 disposed on an underside of a motor 15. The pump 14 is positioned inside the transmission casing 1. The motor 15 projects outward through the installation opening 2 of the transmission casing 1. Most of the motor 15 lies outside the transmission casing 1. A line 16, through which the hydraulic medium can be drawn up in a conventional way, is connected to the pump 14. The hydraulic medium used is advantageously the transmission oil located in the transmission casing 1.

The hydraulics casing 10 has a lateral casing shoulder 17, which is located inside the transmission casing 1 and to the underside of which the pump 14 is attached and to the top side of which the motor 15 is attached. The lateral casing shoulder 17 has a passage opening 18 for a pump shaft 19 and a motor shaft 20, which are coupled to one another in a conventional way inside the casing shoulder 17. The pressure medium, which is delivered by the pump 14, passes through a pressure line 21 to the corresponding solenoid valves 4 to 8 in the hydraulics casing 10. The solenoid valves 4 to 8 are used in a conventional way to control the flow of the pressure medium to the components that are to be activated.

The magnetic parts of the valves 4 to 8 are accommodated in the magnet casing 3, preferably by being cast into the magnet casing 3, so that they are protected from damage. The valve parts project out of the magnet casing 3 into the hydraulics casing 10. The magnet casing 3 advantageously has an electrical connection 22 for the solenoid valves 4 to 8 on the side that is remote from the motor 15.

A reservoir 24 for the pressure medium is connected to the hydraulics casing 10 through a line 23. In the embodiment shown in FIGS. 1 to 3, the reservoir 24 is located outside the transmission casing 1.

As shown in FIG. 2, the magnet casing 3 bears against the hydraulics casing 10, with at least one annular seal 25 in between. On a side of the hydraulics casing 10 that faces the magnet casing 3, the hydraulics casing 10 has a recess 26 in which the annular seal 25 is fitted and against the edge of which it bears. The magnet casing 3 rests on the rim 27 of the hydraulics casing 10, which surrounds the recess 26. As an alternative to the annular seal 25, it is also possible, for example, to use a bead of silicone, a face seal, or a potting for the two casing parts.

As shown in FIG. 2, the hydraulics casing 10 has a receiving space 28 for the actuating device 29 that forms the gear selector and that can be used to select the gate arms of the manual transmission and to engage the gears. The actuating device 29 has a U-shaped control element 30 that is positioned in the receiving space 28 and on each of the two limbs 31, 32 of which an actuating element 33, 34 engages (FIG. 2). The actuating element 34 is a piston rod on which there is a piston 35 (FIG. 2), which is guided in a cylinder chamber 36 of the hydraulics casing 10. A line 37, through which hydraulic medium is supplied to act on the piston 35, opens into the cylinder chamber 36. The other actuating element 33 may likewise be a piston rod on which there is a piston provided in a cylinder chamber of the hydraulics casing 10. The other actuating element 33 is likewise acted on by hydraulic medium. However, it is also sufficient for the actuating element 33 to be under spring force, with the result that the actuating element 33 is loaded toward the opposite actuating element 34, which is preferably aligned with the actuating element 33.

The two limbs 31, 32 of the control element 30 accommodate a dome-like end 38 of a two-armed gearshift lever 39. The lever 39 is mounted on a pin 40 that passes through the receiving space 28 at right angles to the gearshift lever 39 and is mounted, by its two ends, in the hydraulics casing 10. The pin 40 extends parallel to the longitudinal axis of the U-shaped control element 30.

The end of the gearshift lever 39 that projects out of the receiving space 28 at the bottom bears a clutch piece 41 (see FIG. 3), by which the gearshift lever 39 can be brought into engagement with shifting fingers 42 that are located in a rotationally fixed manner on gearshift shafts 43, which are parallel to one another, of the manual transmission.

Figure 3:
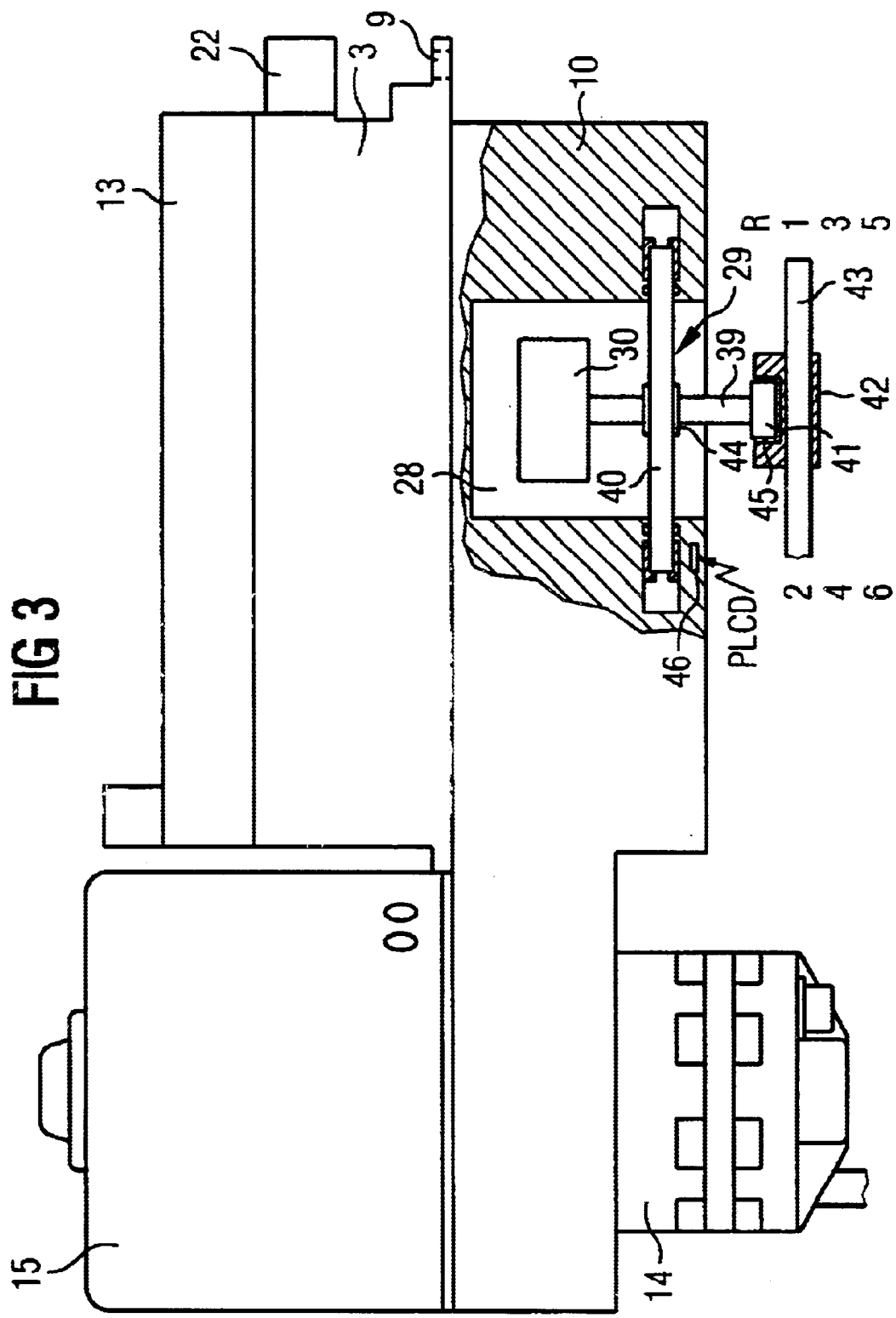
FIG. 3 a fragmentary, partially cross-sectional view of a section taken across line III—III in FIG. 2.

The gearshift lever 39 rests in an axially displaceable manner on the pin 40 by a bush 44 (FIG. 3). Two control members, preferably pistons that are acted on by pressure, are provided for displacement purposes. The control members are not illustrated and engage on the right-hand and left-hand end sides of the control element 30 as seen in FIG. 3. Depending on the action of these control members, the control element 30 and, therefore, also the gearshift lever 39 are displaced in the desired direction on the pin 40. Because the clutch piece 41 of the gearshift lever 39 engages in the selected shifting finger 42 of the corresponding gearshift shaft 43, in the process, the gearshift shaft 43 is also displaced in the desired direction.

First, the U-shaped control element 30 is pivoted about the axis 40 with the appropriate actuating element 33 or 44, with the result that the clutch piece 41 engages in the corresponding clutch recess 45 (FIG. 3) of the shifting finger 42. As shown in FIG. 2, the transmission has four gearshift shafts 43, on each of which there is a shifting finger 42. The left-hand shifting finger 42, as seen in FIG. 2, is used to select the gate arm for the reverse gear R, and the following shifting fingers are used to select the gate arm for gears 1/2, 3/4, and 5/6. In the process, the gear shift lever 39 is pivoted to the desired extent about the pin 40, so that its clutch piece 41 comes into engagement with the desired shifting finger 42. As soon as the gate arm of the manual transmission has been selected, the non-illustrated control members displace the control element 30 so that, as a result of displacement of the selected gearshift shaft 43, the gear situated in the selected gate arm is engaged. If, in the illustration shown in FIG. 3, the gearshift shaft 43 is displaced to the left, it is then possible, depending on the gate arm selected, for the second, fourth, or sixth gears to be engaged. If the gearshift shaft 43 is displaced to the right in FIG. 3, it is possible, depending on the gate arm selected, for the reverse gear R or the first, third, or fifth gears to be engaged. Such an actuating device 29 is in the prior art and, therefore, only its essential functions have been described.

To record the required pivoting travel of the gearshift lever 39 when selecting the gate arm and the required translational displacement of the gearshift lever 39 to engage the desired gear, the pin 40 is assigned at least one appropriate sensor 46, preferably a PLCD sensor, which is accommodated in the hydraulics casing 10 (FIG. 3).

In the embodiment shown in FIGS. 1 to 3, the motor 15, the pump 14, and the control device are configured as a single unit. The solenoid valves 4 to 8 are disposed in series in the region below the electronics panel 11, which bears the electronic components 12. The magnet parts of the valves 4 to 8 are accommodated in the magnet casing 3, which lies outside the transmission casing 1, while the valve parts are disposed inside the transmission casing 1. Because the electronics 11, 12 and the magnets of the valves 4 to 8 are located outside the transmission casing 1, they are only exposed to low temperature loads. As a result, the service life of the solenoid valves 4 to 8 is increased.

The actuating device 29 is located in a space-saving manner within the hydraulics casing 10, as described above. The sensors 46 that are provided for the purpose of recording the appropriate gearshift position are also accommodated in a space-saving manner in the hydraulics casing 10. The pump 14 and the motor 15 together with the control device form a structural unit, which can be prefabricated and can then easily be fitted into the transmission casing 1.

Figure 4:
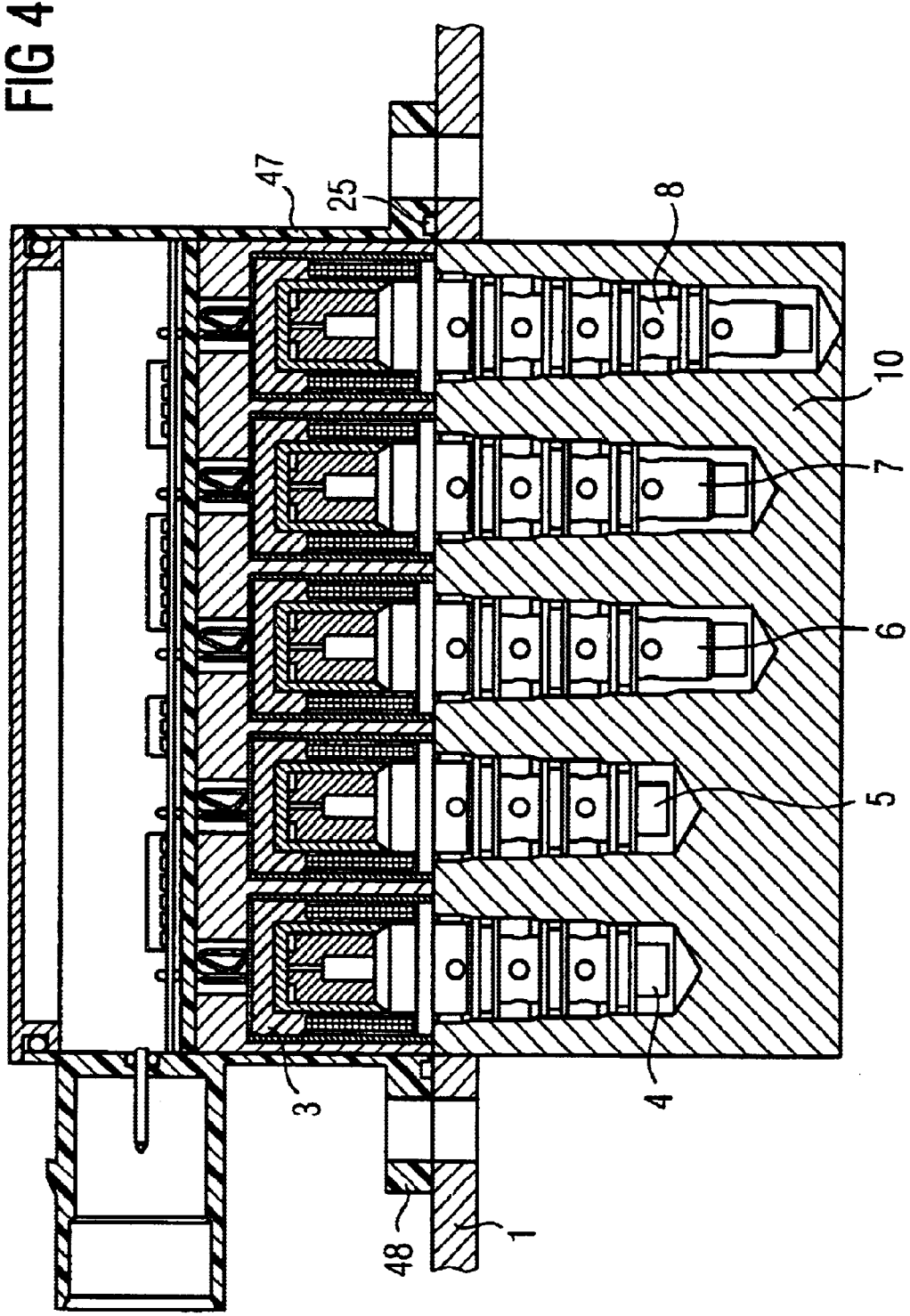
FIG. 4 is a fragmentary, cross-sectional view of a second embodiment of a control device according to the invention.

FIG. 4 illustrates an embodiment in which the hydraulics casing 10 together with the valve parts of the solenoid valves is likewise located inside the transmission casing 1. The magnet casing 3, in which the magnet parts of the solenoid valves 4 to 8 are accommodated in accordance with the previous embodiment, is positioned on the hydraulics casing 10, with the annular seal 25 in between. The magnet casing 3 is accommodated in a plastic casing 47, which, by a circumferential flange 48, rests on the transmission casing 1 and is, for example, screwed to the transmission casing 1. The plastic casing 47 completely surrounds the magnet casing 3. The cover 13 is fitted onto the plastic casing 47. At the periphery, it has an annular seal 49, which is accommodated in a groove 50 that runs all the way around the edge of the plastic casing 47. The annular seal 49 bears in a sealed manner against the inner wall of that part of the plastic casing 47 that projects beyond the electronics panel 11 bearing the electrical/electronic components.

In the above exemplary embodiment, only the cover 13, which is fitted onto the magnet casing 3 is made from plastic. In the embodiment shown in FIG. 4, the plastic casing 47 completely surrounds the magnet casing 3.

The plastic casing 47 is provided on a side wall with the plug connector 22 for the signal lines and for supplying voltage to the control device.

Otherwise, the control device of the instant embodiment is configured identically to that of the embodiment described above. The casing 3, which contains the magnet parts of the solenoid valves 4 to 8, is located outside the transmission casing 1 so that the sensitive magnet parts are only subject to low temperature loads.

The valve parts of the solenoid valves 4 to 8 are located in a space-saving manner inside the transmission casing 1.

Figure 5:
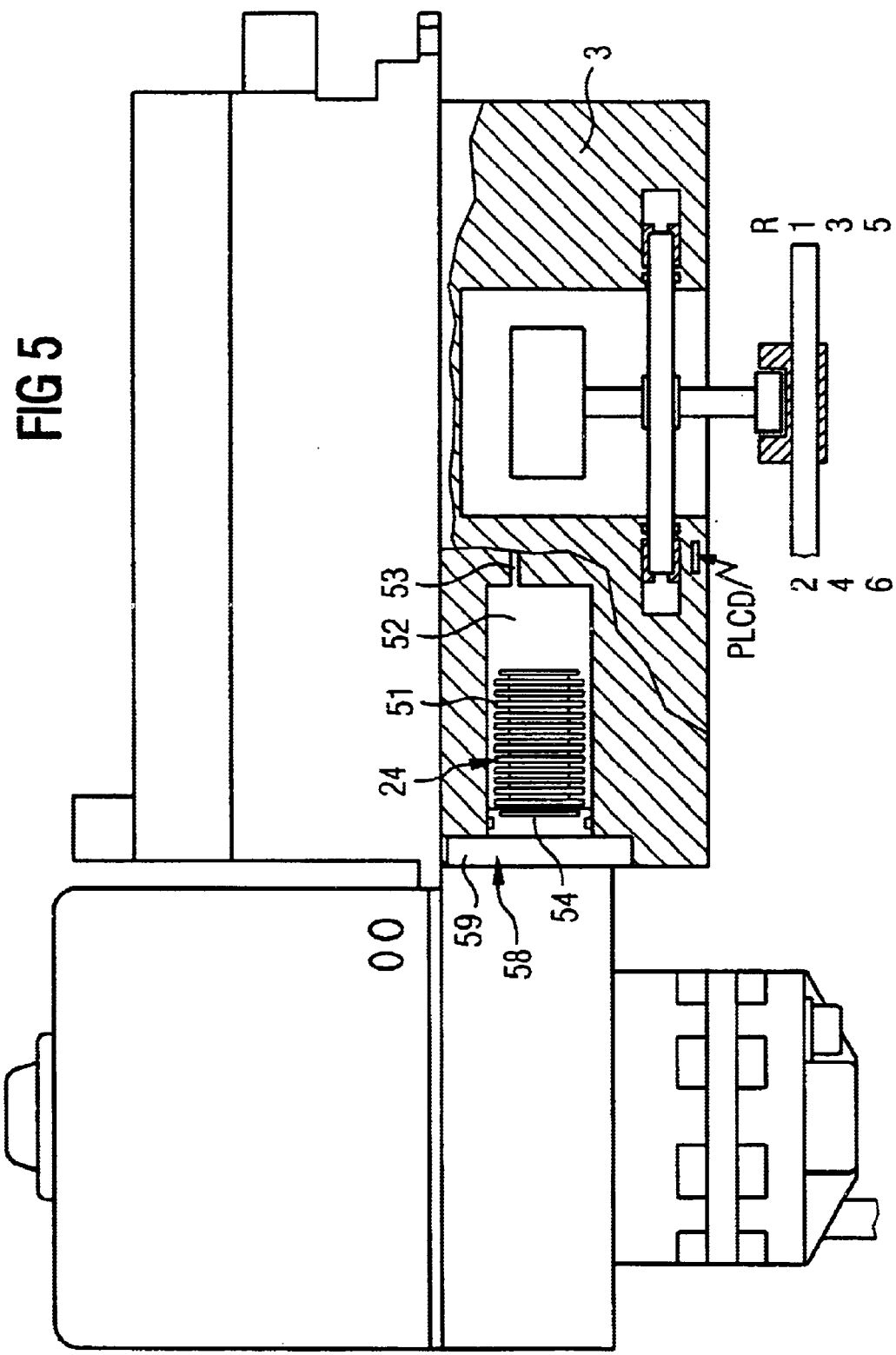
FIG. 5 a fragmentary, partially cross-sectional view of a further embodiment of a control device according to the invention.

FIG. 5 shows an embodiment, which is substantially identical to the exemplary embodiment shown in FIGS. 1 to 3. Unlike the embodiment of FIGS. 1 to 3, the pressure reservoir 24 is not provided outside the control device, but rather is integrated in the control device. The reservoir 24 is accommodated in the magnet casing 3, which, in the installed position of the control device, is located inside the transmission casing. The reservoir 24 used is an air-filled bellows element 51 that is accommodated in a receiving space 52 of the magnet casing 3. A pressure bore or line 53 for the pressure medium opens into the receiving space 52. The bellows element 51 is supported on the base 54 of the receiving space 52. Depending on the pressure of the hydraulic medium in the receiving space 52, the bellows element 51 is compressed to a greater or lesser extent. For its part, the bellows element 51 exerts a pressure on the hydraulic medium located in the receiving space 52.

Figure 8:
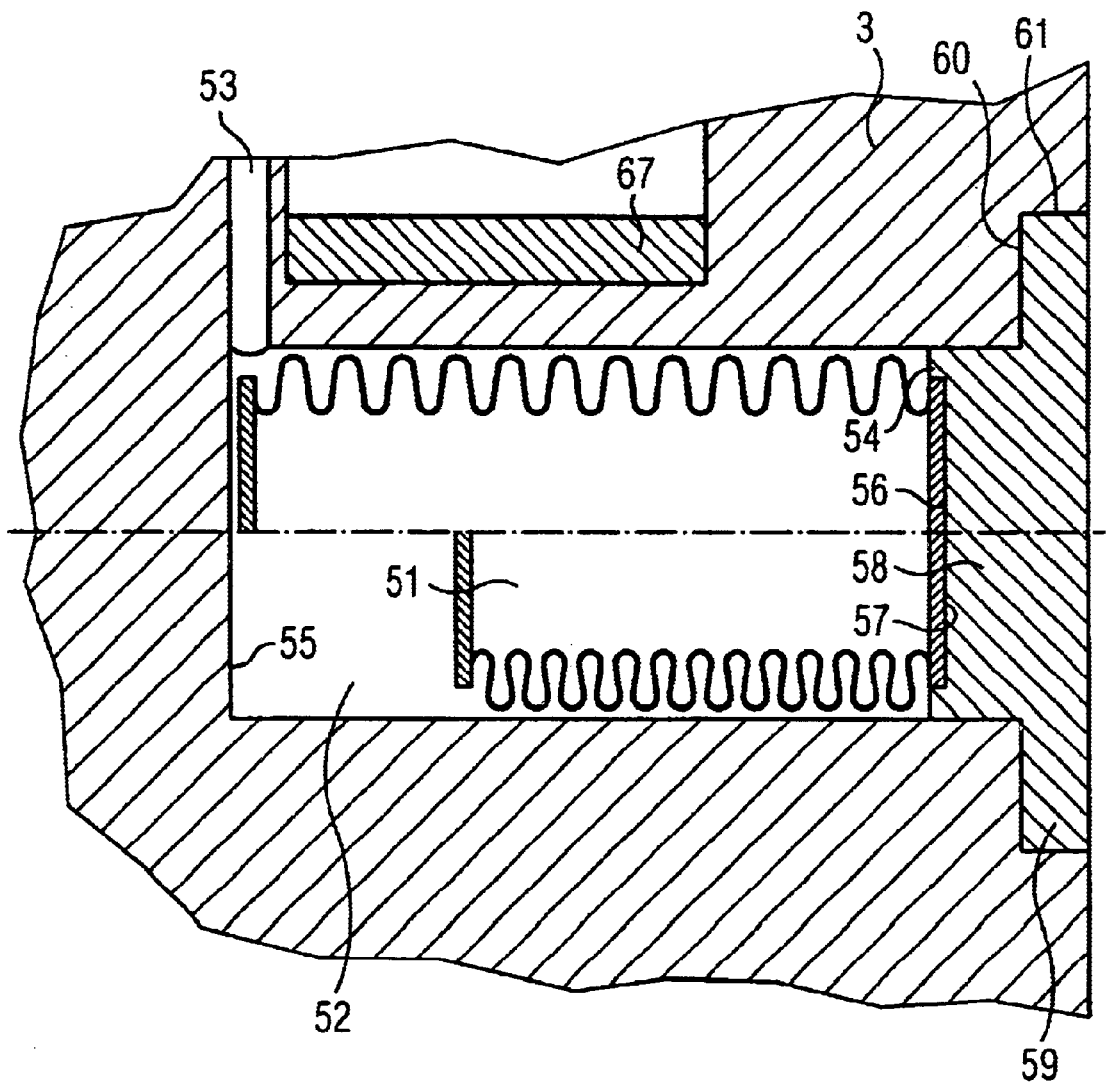
FIG. 8 is a fragmentary, cross-sectional view of a further embodiment of the pressure reservoirs of the control device according to the invention.

FIG. 8 shows an enlarged view of the bellows element 51. In the top half of the figure, the bellows element 51 is illustrated in a limit position, in which its free end bears against that end wall 55 of the receiving space 52 that is opposite the base 54. The bellows element 51 has a baseplate 56, by which it is inserted into a recess 57 in an insert piece 58. The insert piece 58 has a flange 59 that projects radially outward and by which the insert piece 58 is attached to the base 60 of a recess 61 in the magnet casing 3. The end side of the insert piece 58 forms the base 54 of the receiving space 52.

Because the pressure reservoir 24 is accommodated inside the control device, the configuration is compact. Because the magnet casing 3, in which the pressure reservoir 24 is located, lies inside the transmission casing 1, leaking oil from the pressure reservoir 24 can flow directly into the transmission casing 1.

Figure 6:
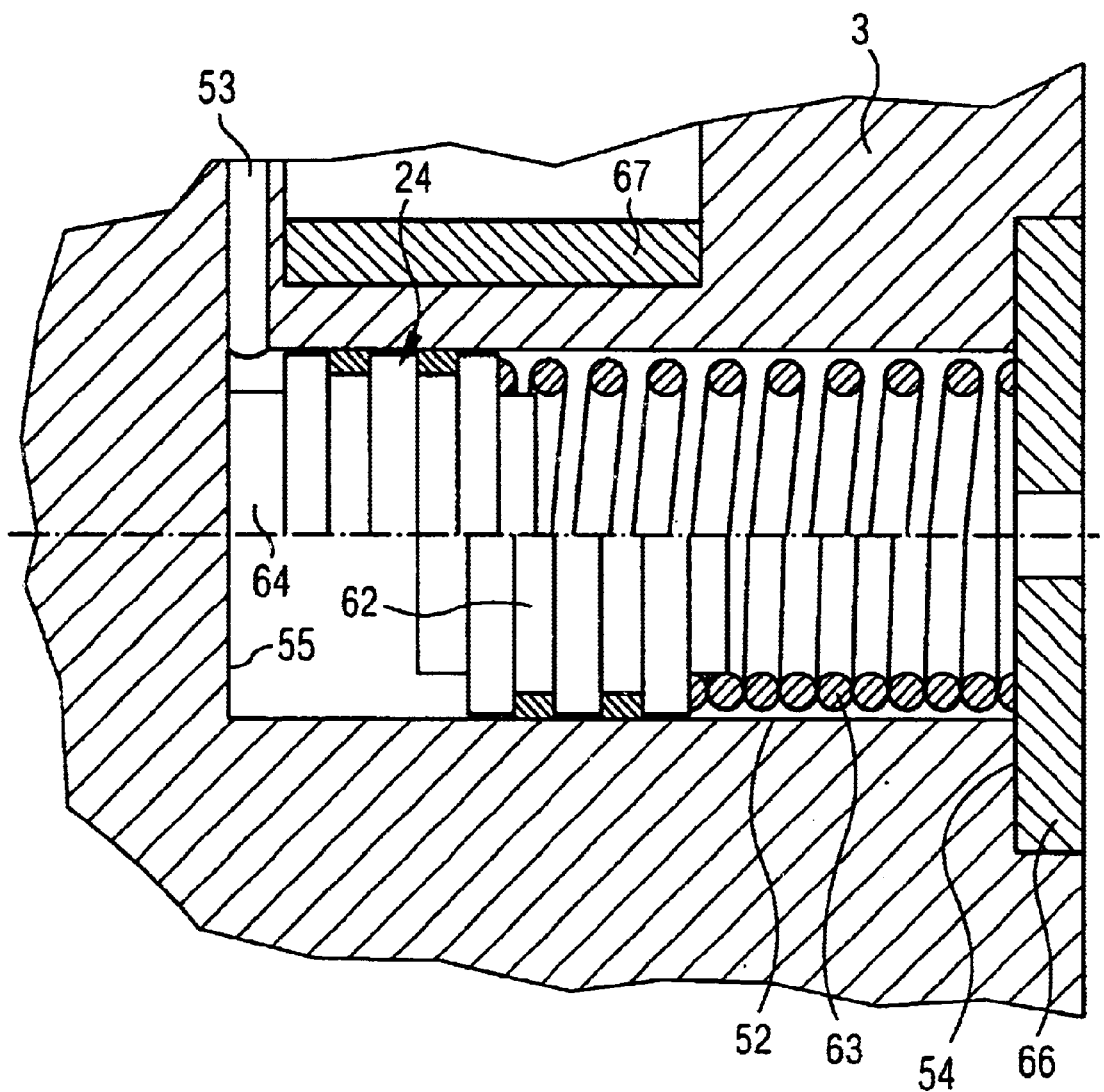
FIG. 6 is a fragmentary, cross-sectional view of an embodiment of pressure reservoirs of the control device according to the invention.

FIG. 6 shows a pressure reservoir 24, which has a piston 62 that is mounted in a sealed manner against the inner wall of the receiving space 52 such that it can be displaced in the magnet casing 3 counter to spring force. At least one compression coil spring 63 that is supported on the base 54 of the receiving space 52 acts on that side of the piston 62 that is remote from the pressure bore 53. At both end sides, the piston 62 is provided respectively with one cylindrical shoulder 64, 65 of reduced diameter. Through the shoulder 64, the piston 62 bears against the end wall 55 of the receiving space 52 under the force of the spring 63 in the load-free state. Because the shoulder 64 has a smaller diameter than the piston 62, the medium flowing in through the pressure bore 53 can act on the piston 62 and displace it counter to the force of the compression spring 63. The top half of FIG. 6 shows the piston 62 in its limit position, in which its shoulder 64 bears against the end wall 55 of the receiving space 52. The bottom half of FIG. 6 shows the piston 62 after it has been displaced counter to the force of the compression spring 63 under the pressure of the hydraulic medium flowing in under pressure through the bore 53.

The base 54 of the receiving space 52 is provided on a closure plate 66, by which the receiving space 52 is closed off after the piston 62 and the compression spring 63 have been installed.

Because, in the embodiment too, the piston 62 is accommodated inside the magnet casing 3, which for its part is located inside the transmission casing 1, leaking oil can flow out directly into the transmission casing 1. The piston reservoir loading state can be recorded easily and inexpensively by a displacement sensor configuration 67. The configuration 67 has a displacement sensor that can be used to record the position of the piston 62 inside the receiving space 52. Depending on the loading state of the reservoir 24, the piston 62 adopts different positions in the receiving space 52. PLCDs, which have been inserted into the magnet casing 3, can be used as the displacement sensor configuration. To determine the position of the piston 62 and, therefore, the reservoir loading state, it is also possible to use a piston travel sensor configuration, which is likewise able to make statements about the position of the piston 62 in the receiving space 52. Depending on the particular application, it may be sufficient to check the limit position of the piston 62 (top-half of FIG. 6) or defined positions of the piston 62 in the receiving space 52. Because the pressure of the hydraulic medium is a variable, which is of interest for control purposes, it is also possible to determine the pressure of the hydraulic medium using a pressure sensor.

Figure 7:
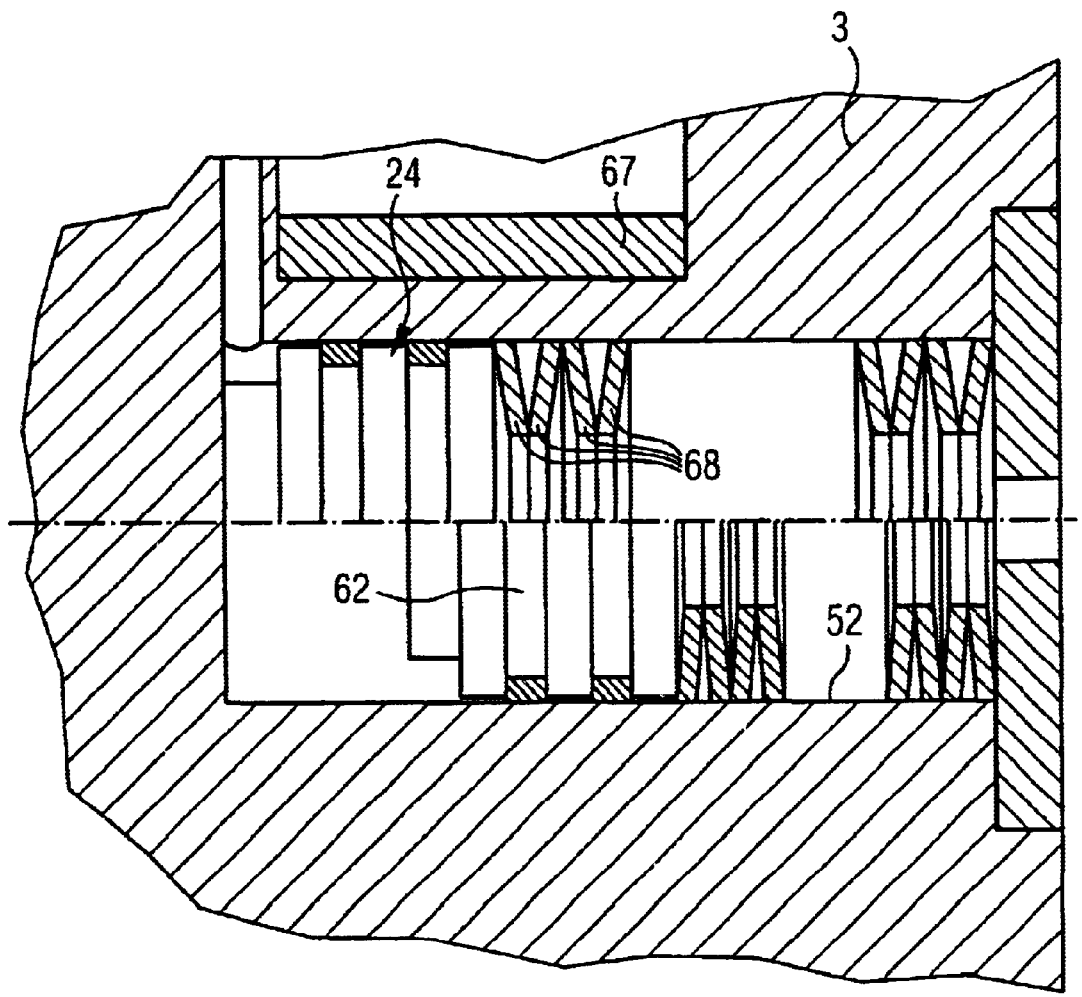
FIG. 7 is a fragmentary, cross-sectional view of another embodiment of the pressure reservoirs of the control device according to the invention.

In the embodiment shown in FIG. 7, the piston 62 is not under the force of a compression coil spring, but rather of a plurality of disk springs 68, which are accommodated alternatively, in opposite directions, in the receiving space 52 of the magnet casing 3. Otherwise, the pressure reservoir 24, apart from the lack of the spring-side insert, is configured identically to the exemplary embodiment shown in FIG. 6.

Figure 9:
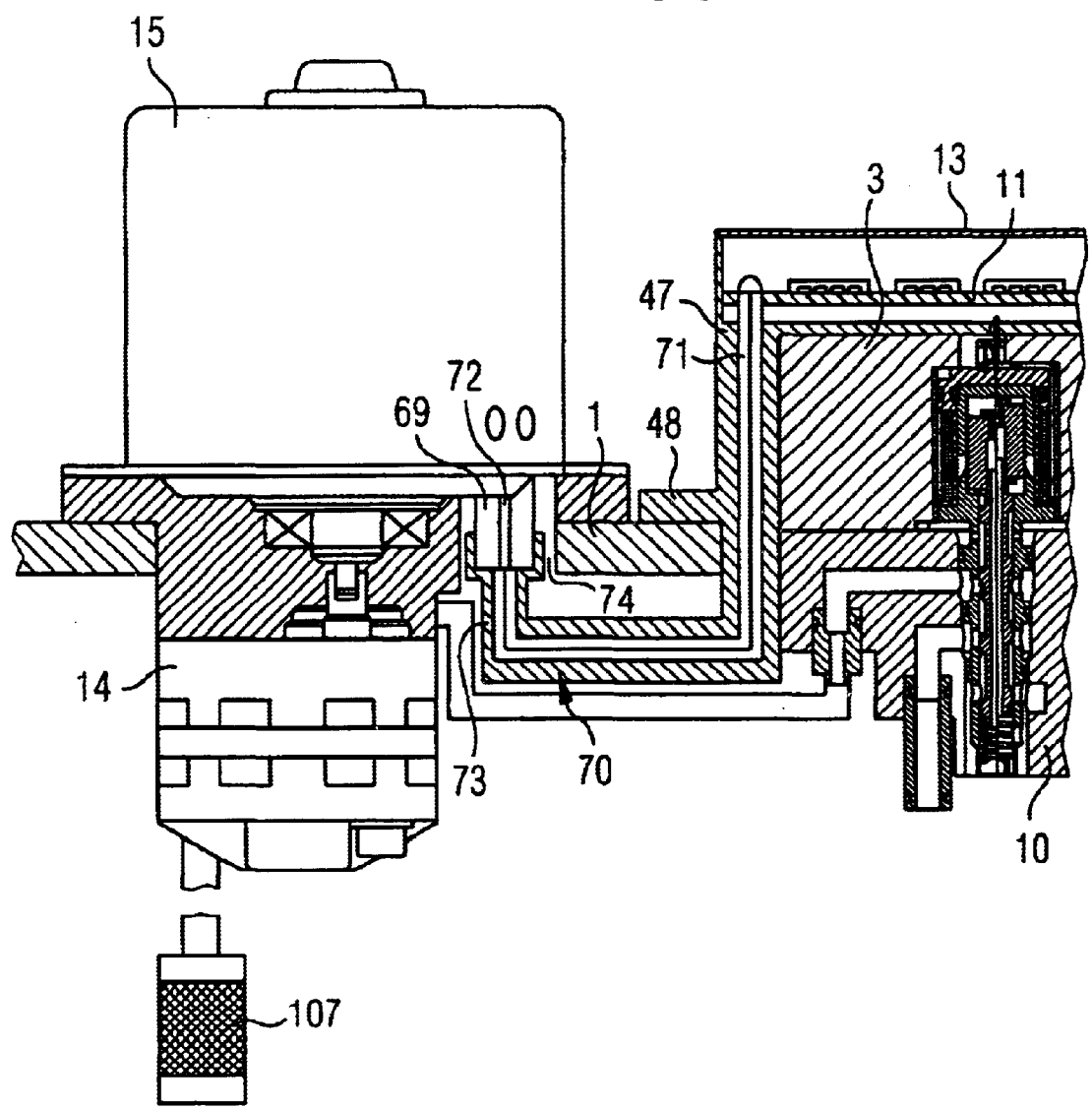
FIG. 9 a fragmentary, partially cross-sectional view of a plug connection between a motor and the control device according to the invention.

FIG. 9 shows an embodiment in which the control device is connected to the motor 15 through a plug connection. The pump 14 is connected directly to the motor 15. In the region next to the pump 14, the motor 15 is provided with a plug-in shoulder 69 that projects downward and onto which a plug-connector arm 70 of the control device is fitted.

The control device has the plastic casing 47 that surrounds the magnet casing 3 and a part of the hydraulics casing 10. In a similar manner to the embodiment shown in FIG. 4, the plastic casing 47 projects beyond the electronic circuit board 11. The current and voltage are supplied to the circuit board 11 by at least one line 71 that runs through the plug-connector arm 70 and, in the coupled state, is electrically connected to a corresponding line 72 in the plug-in shoulder 69 of the motor 15. The plug-connector arm 70 is U-shaped and runs within the transmission casing 1. The plastic casing 47 is positioned, by its flange 48, on the transmission casing 1 and is releasably connected thereto. The motor 15 is also positioned on the transmission casing 1. The pump 14 is located inside the transmission casing 1.

In the installed position, the plug-connector arm 70 projects, by a limb 73, through an opening 74 in the transmission casing 1. The motor 15 with the pump 14 can be coupled to the plug-connector arm 70 by a simple plug-connection operation during installation in the transmission casing 1.

In such an embodiment, the pump 14 and the motor 15 of the control device are separate components that are plugged together to be fitted into the motor vehicle.

Figure 10A:
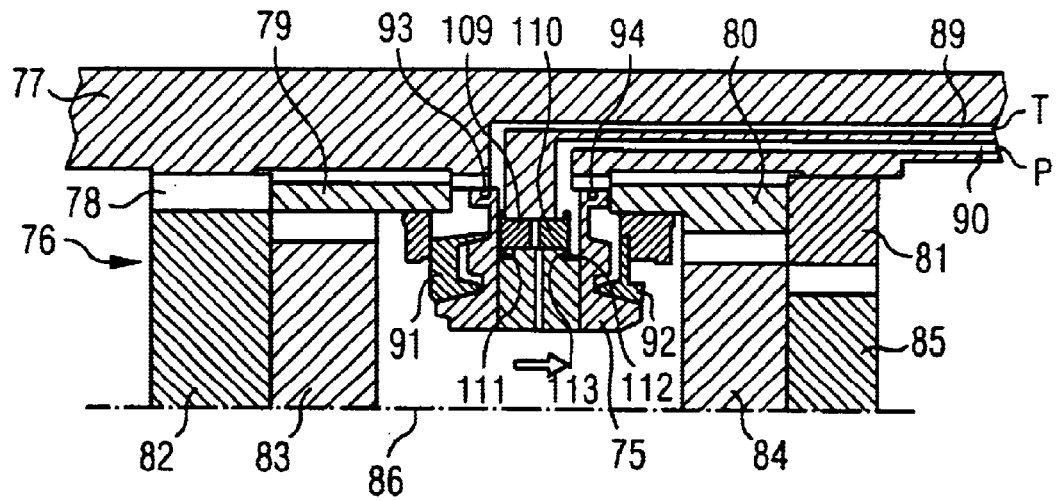
FIG. 10a is a fragmentary, cross-sectional view of a sliding sleeve of a transmission according to the invention in a first shifting position.
Figure 10B:
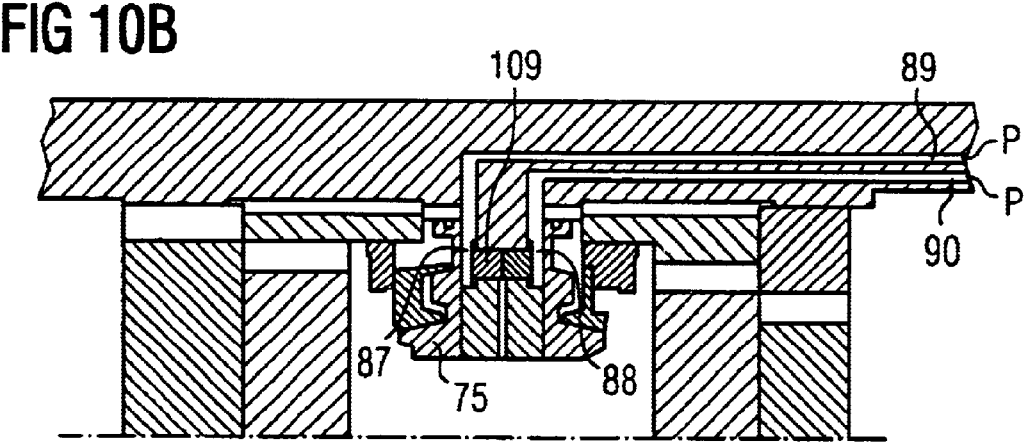
FIG. 10b is a fragmentary, cross-sectional view of the sliding sleeve of FIG. 10a in a second shifting position.
Figure 10C:
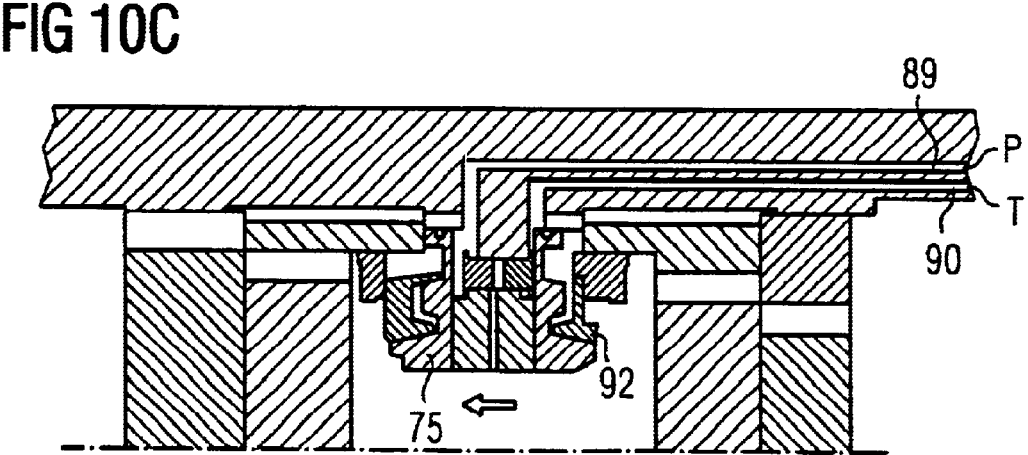
FIG. 10c is a fragmentary, cross-sectional view of a sliding sleeve of FIG. 10a in a third shifting position.

FIGS. 10a to 10c show an embodiment in which gearshift shafts for shifting the manual transmission and the actuating device 29, which was provided for actuation of the gearshift shafts in the previous embodiments, are no longer provided. In such an embodiment, a sliding sleeve 75 of the manual transmission 76 is hydraulically adjusted. The sliding sleeve 75 rests on a transmission shaft 77 on which, in a conventional way, transmission gearwheels 78 to 81 of different sizes are positioned in a rotationally fixed manner. The gearwheels 78 to 81 mesh with transmission gearwheels 82 to 85 that are positioned in a rotationally fixed manner on a further shaft 86 that is parallel to the transmission shaft 77. The annular sliding sleeve 75 has two separate, annular pressure chambers 87, 88 (FIG. 10b), which are each connected to a bore or line 89, 90 that are connected, through a non-illustrated valve configuration, to a pressure-medium source. The two bores 89, 90 are provided in the transmission shaft 77. An annular auxiliary piston 109, 110 is accommodated in each pressure chamber 87, 88. At each of the ends that face away from one another of the coaxial auxiliary pistons 109, 110 there is a flange 111, 112 that is directed radially outward and serves as a stop for the corresponding auxiliary piston 109, 110.

The sliding sleeve 75 can be displaced between two synchronizer rings 91 and 92 that are positioned on the transmission gearwheels 79 and 80.

FIG. 10a shows the sliding sleeve 75 in a position in which a gear of the manual transmission is engaged. The valve configuration is switched such that the pressure medium is fed under pressure into the pressure chamber 87 through the bore 90. As a result, the auxiliary piston 110 is displaced to the left in FIG. 10a until its flange 112 comes into contact with a shoulder-like mating surface 113 of the sliding sleeve 75. The other bore 89 is relieved of load toward the tank T so that the sliding sleeve 75 is displaced to the left out of its central position (FIG. 10b) and comes into engagement with the synchronizer ring 91. The synchronizer ring 91 is displaced relative to the transmission gear 79 in a conventional way.

To displace the sliding sleeve 75 out of the central position shown in FIG. 10b to the right into the position illustrated in FIG. 10c, the valve configuration is switched over such that the hydraulic medium in the bore 89 is placed under pressure while the load at the bore 90 toward the tank T is relieved. As a result, the auxiliary piston 109 in the pressure chamber 87 is displaced to the right by the pressurized hydraulic medium, until its flange 111 comes into contact with a shoulder-like mating surface 114 (FIG. 10b) of the sliding sleeve 75. The sliding sleeve 75 is then shifted to the right into the position illustrated in FIG. 10c. In such a position, the sleeve 75 interacts with the synchronizer ring 92. The synchronizer ring 92 is displaced relative to the transmission gear 80. In such case, a different gear is engaged from the gear, which is engaged in the position shown in FIG. 10a.

To move the sliding sleeve 75 into the central position (FIG. 10b), in which it is not drive-connected to either of the two synchronizer rings 91, 92, the valve configuration is switched such that the hydraulic medium in both bores 89, 90 is placed under pressure. As a result, the two auxiliary pistons 109, 110, which are of identical configuration but disposed mirror-symmetrically with respect to one another, are acted on by hydraulic medium. Their flanges 111, 112 then bear against the mating surfaces 113, 114 of the sliding sleeve 75. As such, the sliding sleeve 75 is held reliably in its central position illustrated in FIG. 10b.

In the embodiment, the control device is completely integrated in the transmission. The gear change takes place in the manner described above by activating the appropriate shifting or sliding sleeves 75. The individual transmission shafts are configured in a corresponding way to the transmission shaft 77 shown in FIG. 10, so that the pressure medium can be supplied through their bores to displace the shifting sleeves 75. To ensure perfect determination of the position of the sliding sleeves 75, sensors 93, 94 are provided on the transmission shaft 77 and can be used to determine the three positions of the sliding sleeve. As in the above embodiments, the valves of the control device are accommodated inside the magnet casing 3 and inside the hydraulics casing 10.

FIGS. 11a to 11e show an embodiment in which the manual transmission is provided with the gearshift shafts 43, but, unlike the embodiments shown in FIGS. 1 to 9, these shafts are hydraulically activated directly. Therefore, the embodiment dispenses with the actuating device 29, which is used to bring the clutch piece 41 on the gearshift lever 39 into engagement with shifting fingers 42 on the various gearshift shafts 43. There is a piston 95, which can be displaced in a sealed manner respectively in one cylinder chamber 96 of the transmission casing 1, on each of the various gearshift shafts 43. The pistons 95 divide the cylinder chambers 96 into two pressure chambers 97, 98, into each of which a pressure line or bore 99, 100 opens out. Pressure medium is supplied through these pressure lines to displace the piston 95 and, therefore, the corresponding gearshift shaft 43.

Each piston 95 has a stop 101, which is configured as a piston and projects through a partition 102, which separates the pressure chamber 98 from a pressure chamber 103. A further pressure bore or line 104, through which a pressure medium can be supplied, opens into the pressure chambers 103. Each piston 101 has, at its end that lies inside the pressure chamber 103, a radially projecting flange 105, by which the pistons 101 bear against the partitions 102 in a limit position (FIGS. 11a to 11d).

As shown in FIG. 11f, the pressure lines 99, 100, 104 associated with each gearshift shaft 43 can be controlled respectively by one solenoid valve 146 to 149. A pressure-control valve 150 is connected upstream of the solenoid valves 146 to 149. A clutch valve 151 is connected upstream of the pressure-control valve, the clutch valve 151 being used to control the flow of the hydraulic medium to the clutch cylinder 152. The clutch cylinder 152 is continuously connected, through a restrictor 153, to the tank T, so that the hydraulic medium can flow back to the tank T after the operation of the clutch even if the clutch valve 151 is closed.

FIG. 11a shows the situation in which the gearshift shaft 43 for the reverse gear R is held in the neutral position N. For such a purpose, pressure medium is passed into the pressure chamber 103 through the pressure line 104, so that the piston 101, by its flange 105, bears against the partition 102 under the force of the pressure medium. The piston 95 is under the force of the pressure medium, which is situated in the pressure chamber 97 and is placed under pressure through the pressure line 99. As a result, the piston 95 bears against the piston 101 under the force of the pressure medium. Because the surface of the piston 95 that is acted on by the pressure medium in the pressure chamber 97 is smaller than that surface of the piston 101 that is acted on by the pressure medium in the pressure chamber 103, the piston 95 and, therefore, the gearshift shaft 43 are reliably held in the neutral position N shown in FIG. 11a. A gearshift fork 115, the two fork limbs 116, 117 of which are in engagement with the shifting sleeve 75, is in an axially fixed position on the gearshift shaft 43. The shifting sleeve 75 is positioned on the transmission shaft 77 of the manual transmission. As such, all the gearshift shafts 43 are connected to the sliding sleeves 75 on the corresponding transmission shafts 77 through gearshift forks 115.

If reverse gear R is to be engaged, only the pressure in the pressure line 104 is relieved toward the tank by the solenoid valve 149 (FIG. 11f), so that the piston 101 is shifted downward by the piston 95 until the piston 101 bears against the base of the pressure chamber 103. Because the gearshift fork 115 is in a fixed position on the gearshift shaft 43, when the piston 95 and, therefore, the gearshift shaft 75 are displaced by the gearshift fork 115, the shifting sleeve 75 is displaced on the transmission shaft 77 in the manner described with reference to FIGS. 10a to 10c. Pressure continues to act on the pressure medium in the pressure chamber 97, so that the piston 95 is pressed firmly onto the piston 101. The pressure in the pressure line 100 is relieved both in the neutral position N and during engagement of reverse gear R. If the transmission is to be shifted back out of reverse gear R into the neutral position, the pressure medium in the pressure chamber 103 is placed under pressure again by switching over the solenoid valve 149, with the result that, on account of the different sizes of the piston faces of the pistons 103 that have been described, the position illustrated in FIG. 11a is restored. In the process, the piston 95 and, therefore, the gearshift shaft 43 are pushed back, displacing the sliding sleeve 75 into the corresponding position through the gearshift fork 115. The pressure medium in the pressure chamber 97 remains continuously under pressure.

FIG. 11b shows the gearshift shaft 43, which is provided for first and second gears of the manual transmission. The gearshift shaft 43 adopts the neutral position N. For such a purpose, the pressure medium in the pressure chamber 97 is placed under pressure. The pressure medium in the pressure chamber 103 is also under pressure. The pressure line 100 is relieved of pressure toward the tank T. If second gear is to be engaged, the pressure medium in the pressure chamber 98 is placed under pressure through the pressure line 100 by switching the solenoid valve 146, while the pressure line 99 is relieved of pressure toward the tank T. As a result, the piston 95 and, therefore, also the gearshift shaft 43 in FIG. 11b are moved upward until the piston 95 comes into contact with the base of the pressure chamber 97. The pressure medium in the pressure chamber 103 is kept under pressure. Through the gearshift fork 115, the shifting sleeve 75 is displaced in the required direction on the corresponding transmission shaft 77.

To shift back out of second gear into the neutral position N, the pressure medium in the pressure chamber 97 is placed under pressure through the pressure line 99 by switching over the solenoid valve 146, while the pressure line 100 is relieved of pressure toward the tank T. The pressure medium in the pressure chamber 103 remains under pressure so that the piston 95 together with the gearshift shaft 43 returns to the neutral position N illustrated in FIG. 11b and the sliding sleeve 75 is displaced on the corresponding transmission shaft 77 by the gearshift fork.

If first gear is to be engaged, only the pressure line 104 is relieved of pressure toward the tank, by switching over the solenoid valve 146, so that the piston 101 is displaced downward by the piston 95 that is under pressure until the piston 101 comes into contact with the base of the pressure chamber 103. To return to the neutral position N, the pressure medium in the pressure chamber 103 is placed under pressure through the pressure line 104, with the result that the piston 101 is moved back and brings the piston 95 with it. The pressure medium in the pressure chamber 97 remains under pressure. Due to the different piston surface areas acted on by pressure medium as described above, the piston 95 is moved back in the manner described.

FIG. 11c shows the gearshift shaft 43 for third and fourth gears of the manual transmission. The gearshift shaft 43 adopts the position required for engagement of fourth gear. In such a case, the pressure line 99 is relieved of pressure toward the tank by the suitably switched solenoid valve 147, while the pressure medium in the pressure chamber 96 is placed under pressure through the pressure line 100, with the result that the piston 95 together with the gearshift shaft 43 is displaced upward in FIG. 11c until the piston 95 comes into contact with the base of the pressure chamber 97. The pressure medium in the pressure chamber 103 is kept under pressure. The piston surface area acted on in the pressure chamber 103 is larger than the opposite piston surface area 106, so that the piston 101 remains in its stop position against the partition 102. Through the gearshift fork 115, the sliding sleeve 75 is displaced on the corresponding transmission shaft 77.

To shift back out of fourth gear into the neutral position N, the pressure line 100 is relieved of pressure toward the tank by switching over the solenoid valve 147, and the pressure medium in the pressure chamber 97 is placed under pressure through the pressure line 99. As a result, the piston 95 is moved back until it bears against the piston 101, which is under the pressure of the pressure medium in the pressure chamber 103.

If third gear is to be engaged, the solenoid valve 147 is switched over such that the pressure in the pressure chamber 103 is relieved, so that, as has been described with reference to FIG. 11b, the piston 101 is displaced downward by the piston 95 that is under pressure until the piston 101 comes into contact with the base of the pressure chamber 103 (see FIG. 11e). To shift back from third gear into the neutral position N, the pressure medium in the pressure chamber 103 is placed under pressure through the pressure line 104 by switching over the solenoid valve 147, with the result that the piston 101 is moved back and takes the piston 95 with it in the manner described. As soon as the flange 105 of the piston 101 is in contact with the partition 102, the neutral position N has been reached.

Finally, FIG. 11d shows the gearshift shaft 43 for fifth and sixth gears of the manual transmission. The gearshift shaft 43 adopts the position, which corresponds to the neutral position N. As has been described in detail above, it is possible, by applying different pressures by suitable switching of the solenoid valve 148, for the gearshift shaft 43 and, through the gearshift fork 115, the corresponding transmission shaft 77 to be displaced such that fifth or sixth gear is engaged.

In the embodiment shown in FIGS. 11a to 11e, the gearshift shafts 43 are hydraulically actuated directly. Otherwise, the control device is configured identically to that described in the previous exemplary embodiments. For example, the control device likewise has the solenoid valves, the magnet parts of which are accommodated in the magnet casing 3, and the valve parts of which are accommodated in the hydraulics casing 10.

The control devices described are distinguished by the fact that they include only a few compact components, so that they have only a low weight and allow optimum utilization of space. The electronics, the sensor configuration, and the actuator configuration are accommodated within a very tight space, so that there are only short distances between them. There are no complex lines and cable harnesses between the pressure-medium supply, the gear selector, the clutch, and the electronics. As a result, a considerable cost saving is achieved due to the low outlay on logistics. The production outlay is also low. Because there are no plug, soldered and crimped connections of plug connectors and cable harnesses in the control devices described, the reliability of the control devices is also high. There is no need for an external tank to supply the pressure medium. The same medium, i.e., transmission oil, can be used for the hydraulics function and for the transmission. The pump 14 draws in the transmission oil directly through oil filters 107, as shown by way of example in FIG. 9. Because at least the hydraulics casing 10 of the control devices is located inside the transmission casing 1, there are only low noise emissions, due to the muffling action of the transmission casing 1. The solenoid valves 4 to 8 have a simple configuration. In particular, there is no sealed magnet casing, so that corresponding plastic plug connectors, seals, screw faces, and the like can be dispensed with. Rather, as shown by way of example in FIG. 1, the magnet parts of the solenoid valves 4 to 8 are directly connected, through spring contacts 108, to the corresponding electrical/electronic components 12 of the electronics panel 11. Due to the integrated configuration, there is no need to install various subsystems and to make hydraulic and electrical contact between them. The ease of assembly is considerably improved. In the embodiments shown in FIGS. 1 to 9, the control devices are complete components, so that all the components required for operation are integral. Therefore, it is possible to check that the control devices are operating correctly before they are installed in the transmission. In the embodiments shown in FIGS. 10 and 11, the control device is integrated in the transmission, so that in these cases only the fully assembled manual transmission can be tested.

In the embodiment shown in FIGS. 12 to 15d, the shaft 40 is rotated about its axis by an actuator 118 accommodated inside the hydraulics casing 11 to select the gate arm. The actuator 118 is provided on one end of the shaft 40, the other end of which bears the piston 95, which is of identical configuration to that used in the embodiment shown in FIG. 11. As has been described in detail with reference to FIG. 11, the piston 95 interacts with the piston 101. The gearshift lever 39, which, through rotation of the shaft 40, can optionally be brought into engagement with the shifting finger 42 of the corresponding gearshift shaft 43, is in a rotationally fixed position on the shaft 40.

By way of example, the manual transmission is configured such that the shaft 40, starting from the neutral position N, in FIGS. 12 and 13 can be rotated into the appropriate gate arm of the manual transmission through rotation about its axis, so that the gears in the selected gate arm can then be engaged.

The actuator 118 has a cylindrical casing 119 (FIGS. 14 and 15a to 15d), which, on an inner wall, has two protrusions 120 and 121 situated diametrically opposite one another. An outer rotary piston 122 bears against the inner wall of the casing 119, which rotary piston 122, on its outer side, has two recesses 123 and 124 that lie diametrically opposite one another, that run in the circumferential direction, and that are longer in the circumferential direction than the protrusions 120, 121 of the casing 119. On its inner wall, the annular rotary piston 122 is provided with recesses 125, 126 that lie diametrically opposite one another, are shorter in the circumferential direction than the outer recesses 123, 124 and are disposed offset in the circumferential direction with respect to these outer recesses.

An inner, annular rotary piston 127 bears against the inner wall of the outer rotary piston 122. The inner rotary piston 127 is provided on its outer side with radially projecting protrusions 128, 129 that lie diametrically opposite one another and are shorter in the circumferential direction than the inner recesses 125, 126 of the outer rotary piston 122, in which they engage. On the inner side, the rotary piston 127 is provided with spring-like protrusions 130, 131 that lie diametrically opposite one another and engage in axial grooves 132, 133 in the shaft 40. As a result, the inner rotary piston 127 is in a rotationally fixed position on the shaft 40. Because the protrusions 130, 131 and the grooves 132, 133 run in the axial direction, the shaft 40 can be axially displaced with respect to the inner rotary piston 127 when the piston 95 or the piston 101, as has been explained with reference to FIG. 11, is acted on by hydraulic medium.

Figure 15A:
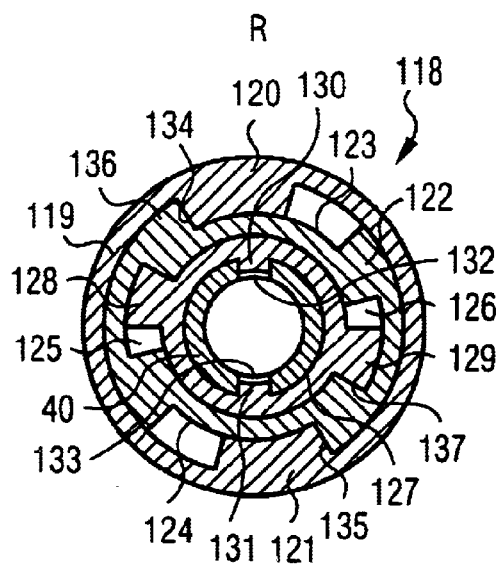
FIGS. 15a to 15d are enlarged, cross-sectional views of various shifting positions of the actuator of FIG. 14.

FIG. 15a shows the situation in which the gate arm for reverse gear R is selected. The two rotary pistons 122, 127 are acted on by hydraulic medium. The radially running piston faces 134, 135 of the outer rotary piston 122 are bearing against the protrusions 120, 121 of the casing 119. The protrusions 128, 129 of the inner rotary piston 127 are bearing against side walls 136, 137 of the inner recesses 125, 126 of the outer rotary piston 122 under the pressure of the hydraulic medium. Because the inner rotary piston 127 is in a rotationally fixed position on the shaft 40, the shaft 40 adopts the corresponding rotary position, in which the gearshift lever 39, which is in a rotationally fixed position on the shaft, engages in the gearshift shaft 33 required in order to engage reverse gear.

Figure 15B:
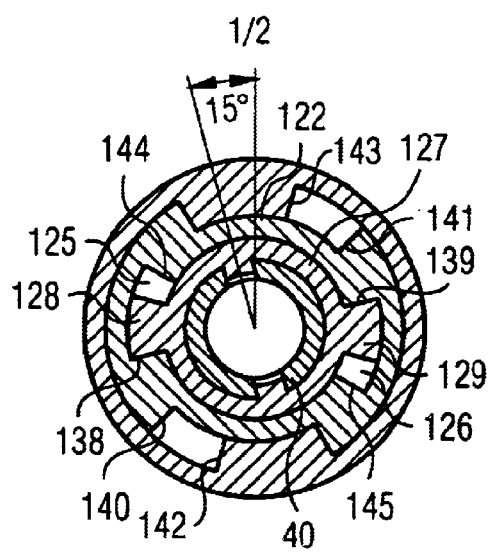
Figure 15C:
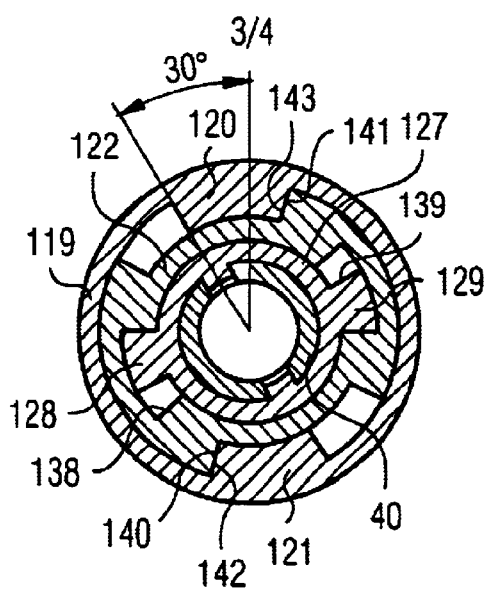

If the gate arm for engagement of first and second gears is to be selected, the protrusions 128, 129 of the inner rotary piston 127 are acted on by hydraulic medium such that the inner rotary piston 127 is rotated counterclockwise out of the position shown in FIG. 15a until its protrusions 128, 129 come into contact with the opposite side walls 138, 139 of the inner recesses 125, 126 of the outer rotary piston 122 (FIG. 15b). The outer rotary piston 122 continues to be acted on by pressure, so that it remains in contact with the protrusions 120, 121 of the casing 119. In the exemplary embodiment illustrated, the angle of rotation of the inner rotary piston 127 out of the position shown in FIG. 15a into the position shown in FIG. 15b is, for example, 15°. Because the shaft 40 is connected in a rotationally fixed manner to the inner rotary piston 127, the shaft 40 is rotated to a corresponding degree. As a result, the gearshift lever 39 that is in a rotationally fixed position on the shaft 40 is pivoted such that it comes into engagement with the shifting finger 42 of the corresponding gearshift shaft 43.

From the position shown in FIG. 15b, to select the gate arm for third and fourth gears, the outer rotary piston 122 is acted on by hydraulic medium such that it is rotated counterclockwise out of the position shown in FIG. 15a or FIG. 15b until its radially running piston faces 140, 141 that are at the front in the direction of rotation come into contact with the side walls 142, 143 of the protrusions 120, 121 of the casing 119. Over part of the rotary travel of the outer rotary piston 122, the inner rotary piston 127 is moved with it. In the position shown in FIG. 15b, the protrusions 128, 129 of the inner rotary piston 127 lie at a distance from the rear side wall 144, 145 (as seen in the direction of rotation) of the inner recesses 125, 126 of the outer rotary piston 122. If the outer rotary piston is rotated counterclockwise in the manner described, its side walls 144, 145, after part of its rotary movement, come into contact with the protrusions 128, 129 of the inner rotary piston 127, and the outer rotary piston takes the inner rotary piston with it as it rotates onward into the position illustrated in FIG. 15c. In such a position, the protrusions 128, 129 of the inner rotary piston 127 are at a distance from the side walls 138, 139 of the recesses 125, 126 of the outer rotary piston 122. The rotary movement of the inner rotary piston 127 is in such a case, starting from the position shown in FIG. 15b, 15°, for example. As such, with respect to the position shown in FIG. 15a, the shaft 40 has overall been rotated through 30° about its axis. Thus, the gearshift lever 39 on the shaft 40 is pivoted such that it comes into engagement with the gearshift shaft 43 of the manual transmission that is provided for third and fourth gears.

Figure 15D:
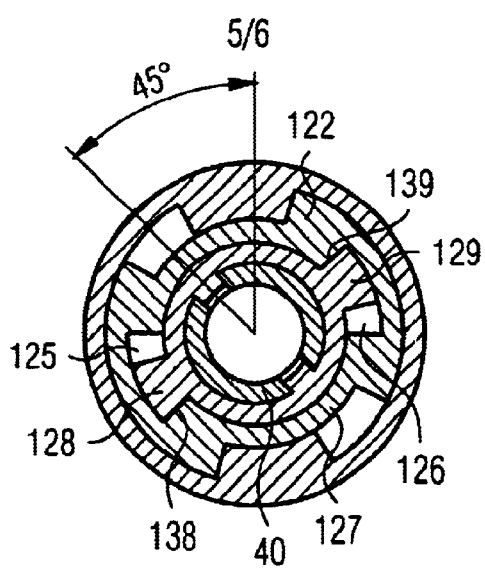

Finally, in the exemplary embodiment illustrated, the shaft 40 can be rotated a further 15° about its axis to select the gate arm for fifth and sixth gears. To achieve such rotational movement, the outer rotary piston 122 continues to be held in its stop position shown in FIG. 15c by the application of pressure. By the application of pressure, the inner rotary piston 127 is rotated further in the counterclockwise direction, until its protrusions 128, 129 come into contact with the side walls 138, 139 of the recesses 125, 126 of the outer rotary piston 122 (FIG. 15d). In the process, the gearshift lever 39 on the shaft 40 is pivoted such that it comes into engagement with the gearshift shaft 43 provided for fifth and sixth gears.

As soon as the shaft 40 has been rotated for gear selection purposes in the manner described above, it is displaced in the axial direction by the application of pressure to the pistons 95, 101, as has been described in detail based upon the exemplary embodiment shown in FIG. 11. Then, the desired gear is engaged in the selected gate arm.

To rotate the shaft 40 back again, the corresponding applications of pressure to the rotary pistons 122, 127 take place in the reverse order.

The bores in the hydraulics casing 10 that are required to supply the hydraulic medium to the various pressure chambers formed by the recesses in the two rotary pistons 122, 127 are not shown for the sake of clarity. The valves required to place the various pressure chambers under a suitable pressure are also not shown.

In the exemplary embodiment described, the angles of rotation are in each case given as 15° purely by way of example. Naturally, the angles of rotation could also vary, depending on the nature of the manual transmission. It is also not necessary for the angles of rotation used to select the corresponding gate arms to be identical. With the actuator 118 described, it is also possible for the gearshift shaft 43 to be rotated directly, i.e., to dispense with the gear selector 29.

The control devices described allow simple storage and management of spare parts. As shown in FIGS. 1 and 4, only a single connection 22 is provided for the signal lines and for supplying voltage to the control devices. The configuration at least reduces or possibly even eliminates altogether any undesirable interfering signals. As shown by the exemplary embodiments below, there are also advantages to using a plurality of connections/plug connectors. The casing 3, 10 of the control devices has a simple configuration. The internal parts of the casing may be made from aluminum and plastic, while the outer parts of the casing 3, 10 advantageously are plastic. Because of the smaller number of components, environmental pollution is also reduced. The consumption of resources is also reduced.

Because the control device has at least the hydraulics casing 10 located inside the transmission casing 1, the risk of oil escaping as a result of a casing leak is considerably reduced because leaking oil passes directly back into the transmission oil situated in the transmission casing 1. Therefore, the environment is not polluted by oil leaks. Only the single seal 25 that is provided on the contact surface between the magnet casing 3 and the transmission casing 1 is required for the casing 3, 10 of the control device (FIGS. 1 and 4).

FIG. 16 shows an embodiment of the control device in which, in accordance with the above embodiments, the hydraulics casing 10 together with the valve parts of the solenoid valves 4 to 8 is located inside the transmission casing 1. The magnet casing 3, in which the magnet parts of the solenoid valves 4 to 8 are accommodated, is positioned on the hydraulics casing 10, with a sealing element 200 in between, e.g., an annular seal (cf. previous embodiments), a bead of silicone, or a face seal. For reasons of clarity, for example, in each case only a single solenoid valve is illustrated in FIG. 16 and those, which follow. To record the required pivoting displacement of the gearshift lever when selecting the gate arm and the required translational displacement of the gearshift lever for engaging the desired gear, a displacement sensor configuration 201, e.g., a PLCD sensor, a Hall sensor, or a GMR sensor, is integrated in the sealed electronics space of the magnet casing 3, preferably, by being cast in or embedded in potting compound. A pick-up magnet 202 for the displacement sensor configuration 201 is attached to the control element 30, which is only diagrammatically illustrated in the figure. The control element 30 functions in the same way as the embodiment described in FIGS. 1 to 3.

To determine the pressure of the hydraulic medium, a pressure sensor configuration 203, e.g., a pressure sensor or a pressure switch, is attached to the hydraulics casing 10 such that it projects into the magnet casing 3. If the sealing element 200 is configured as a face seal, preferably, as a rubber-covered metal seal, so that the pressure sensor configuration 203 is accommodated in the sealed region of the magnet casing 3, there is no need for the pressure sensor configuration 203 to have a dedicated, sealed casing, and there is no need for a sealed leadthrough to the control electronics.

The cover 13, which has been placed onto the magnet casing 3 is configured as a metal plate, e.g., an aluminum plate. The electronics panel 11 is laminated or adhesively bonded onto the side of the cover 13 that faces the electronics space of the magnet casing 3. The configuration ensures simple assembly and good dissipation of heat from the control electronics. The connection elements 204, e.g., wires or contact pins, of the solenoid valves 4 to 8, of the displacement sensor configuration 201, of the pressure sensor configuration 203, or also of plug connectors 205 can be directly pressed or soldered into the electronics panel 11. For such a purpose, the cover 13 has corresponding beads 206 to clear the zones for them to be pressed into or cutouts 207 for soldering. Such cutouts can be closed off by a potting compound, for example, after soldering, so that the magnet casing 3 forms a sealed electronics space with the cover 13. To ensure that the electronics space remains sealed even in the event of pressure differences caused by temperature fluctuations, a non-illustrated pressure compensation element may be disposed in the electronics space or in the magnet casing 3. It is also possible for pressure compensation elements to be provided, for example, in the cover 13 or in a plug connector 205.

Figure 17:
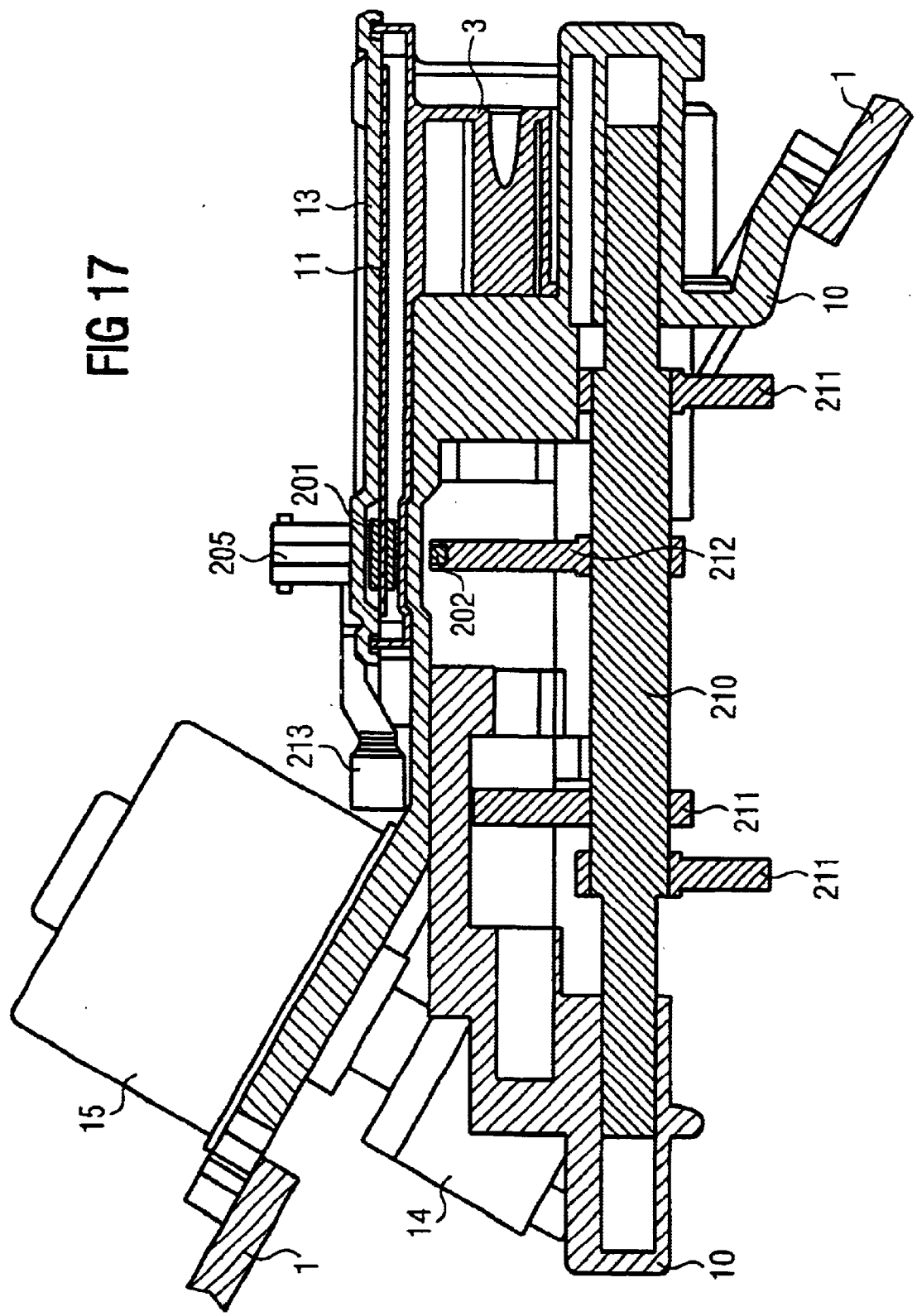
FIG. 17 is a fragmentary, cross-sectional view of another embodiment of the control device according to the invention.

FIG. 17 shows an embodiment in which, unlike the embodiments, which have been described hitherto, it is not the magnet casing 3, but rather the hydraulics casing 10 that is attached, for example, flanged or screwed, to the transmission casing 1. As such, the mechanical stress on the magnet casing 3 is considerably reduced and it can be configured, for example, as an injection molding made from a nonconductive material, preferably, plastic. Unlike the embodiments described above, in such an embodiment, the hydraulics casing 10 is only partially inside the transmission casing 1. However, the configuration has the same advantages as the embodiments in which the hydraulics casing 10 is situated completely inside the transmission casing 1. For example, it is possible for any leakage that occurs to flow directly into the transmission casing in the embodiment. Unlike in the embodiments described above, a translational or axial movement of a gearshift shaft 210 selects the shifting gate arm. Shifting cogs 211 are in a rotationally fixed position on the gearshift shaft 210. Then, as a result of a rotational movement of the gearshift shaft 210, in each case one of the shifting cogs 211 is brought into engagement, so that a gear is engaged.

To determine the position of the gearshift shaft 210, a displacement sensor configuration 201, e.g., a Hall IC or the magnetic coils of a PLCD sensor, is disposed on the electronics panel 11. The associated pick-up magnet 202 is attached to a lever 212, which is disposed, in a similar manner to a shifting cog 211, on the gearshift shaft 210. In such an embodiment too, there is no need for a separate casing for the displacement sensor configuration 201. The motor 15 of the pump 14 is in the embodiment connected to the control electronics through a pump plug connector 213. In a similar manner to the exemplary embodiment shown in FIG. 16, the electronics panel 11 is laminated or adhesively bonded on the cover 13, which is configured as a metal plate.

Figure 18:
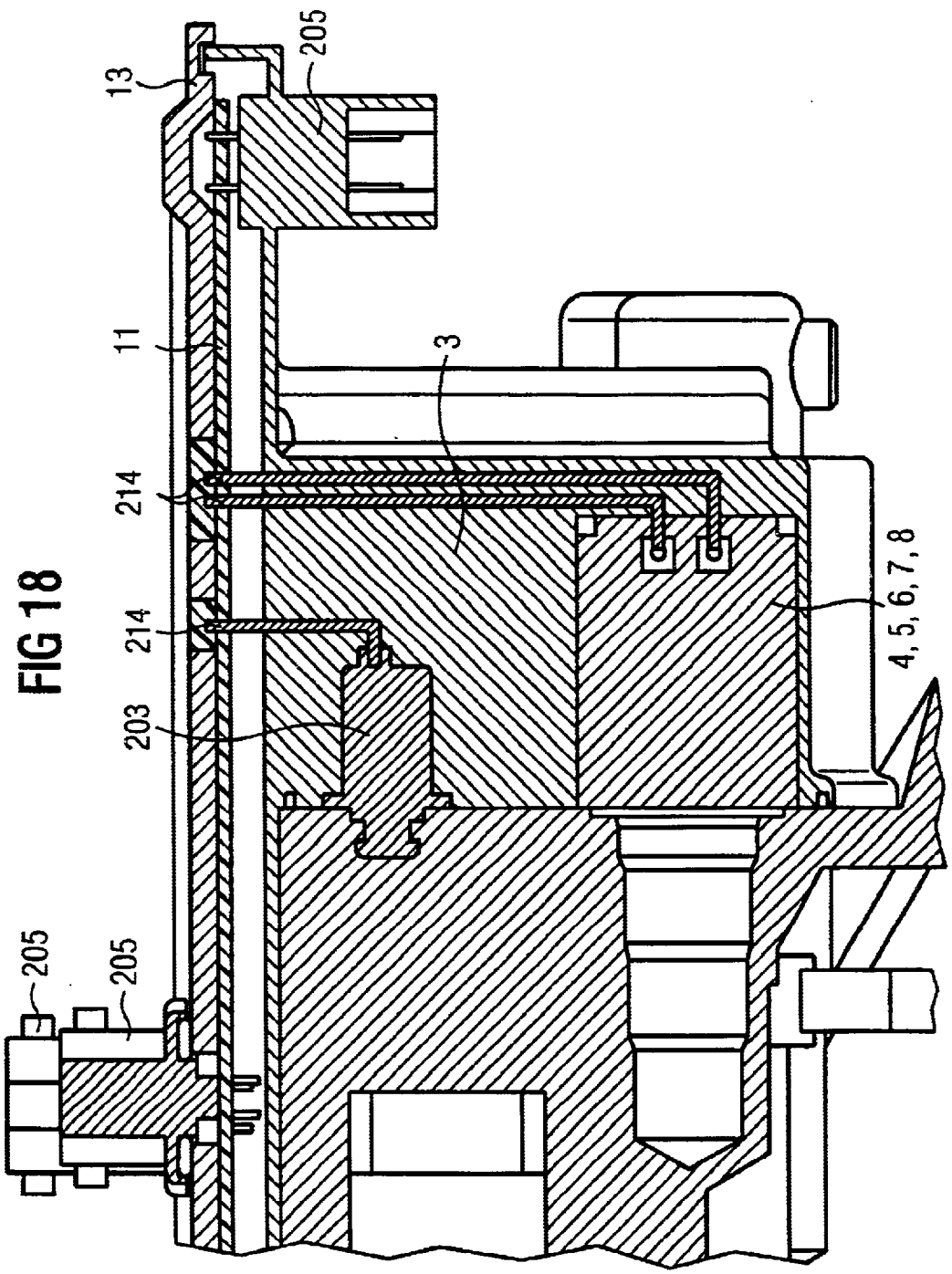
FIG. 18 is a fragmentary, enlarged, cross-sectional view of details of the control device of FIG. 17.

FIG. 18 illustrates a few details of the control device using a partial view of an embodiment, which is substantially identical to the embodiment shown in FIG. 17. If the magnet casing 3 is configured as an injection molding made from a non-conductive material, preferably, plastic, it is possible for one or more plug connectors 205, for example, for supplying voltage to the control device, for external actuators, for the pump motor, or for external sensors—e.g. for determining rotational speeds or the clutch position—, as an alternative to being pressed or soldered in, also to be integrated in the magnet casing, preferably, by injection molding. See, i.e., plug connector 205 of FIG. 18. A plurality of plug connectors 205 have the advantage that, after a functional test that is to be carried out, it is no longer necessary to detach various electrical connections, e.g., the connections to the transmission-internal sensors, because they are fitted into the vehicle together. Such a configuration increases the operational reliability of the system.

The magnet parts of the solenoid valves 4 to 8 (the valve part is, in FIG. 18, only indicated by a corresponding bore) or also the sensor configuration, e.g., the pressure sensor configuration 203, are connected in an electrically conductive manner to the control electronics on the electronics panel 11 by line elements 214 that are integrated, preferably, by injection molding or by being pressed in, in the magnet casing 3. The line elements 214 may be configured, for example, as stamped grids, stamped contacts, stamped wires, or stamped pins. The connection of the line elements 214 to the control and transmission components, e.g., solenoid valves 4 to 8 or pressure sensor configuration 203, is usually configured as a plug contact (cf. connection of the solenoid valve). However, press-in connections are also possible (cf. connection of the pressure sensor configuration 203).

Figure 19:
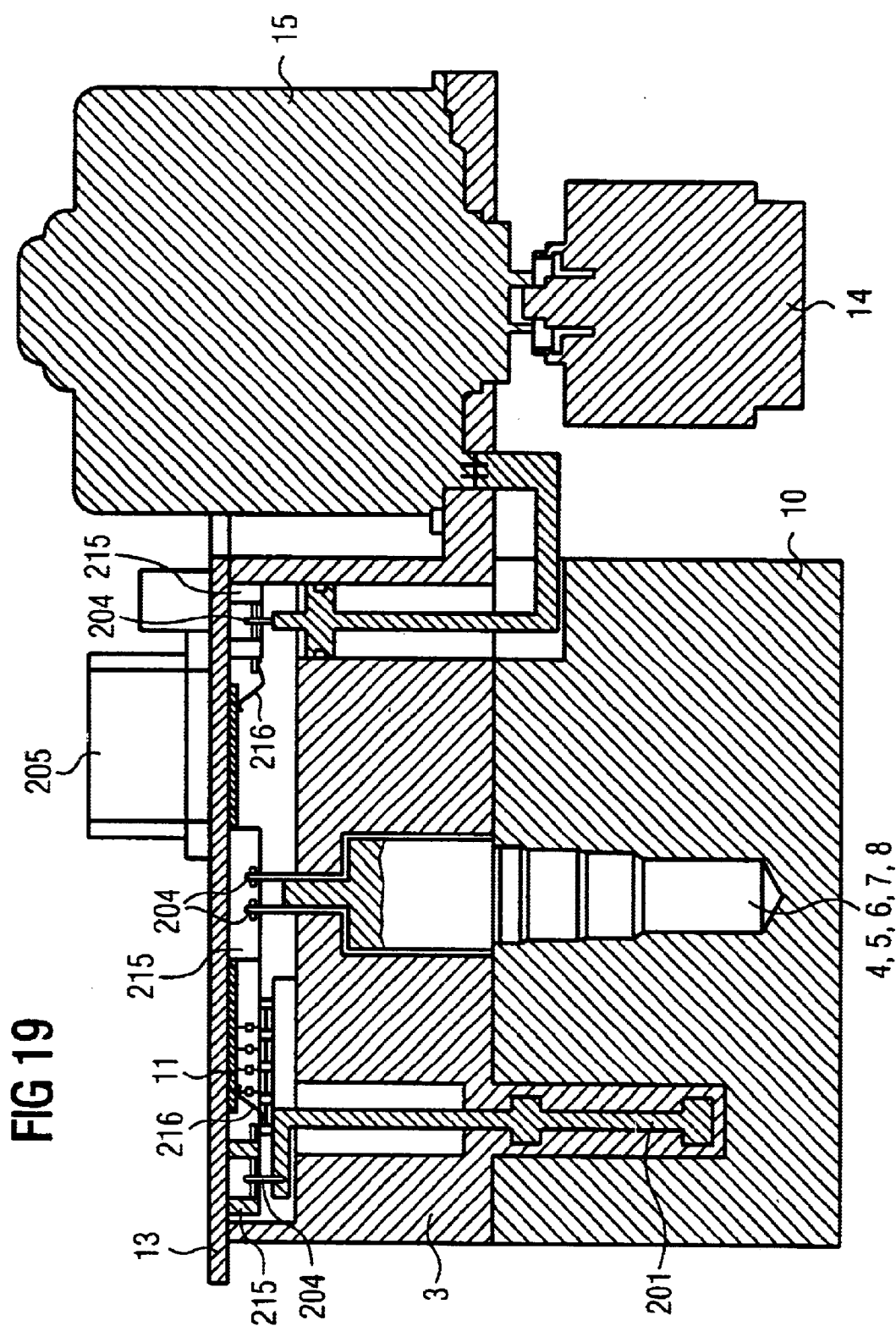
FIG. 19 is a fragmentary, cross-sectional view along section line XIX—XIX in FIG. 21.
Figure 20:
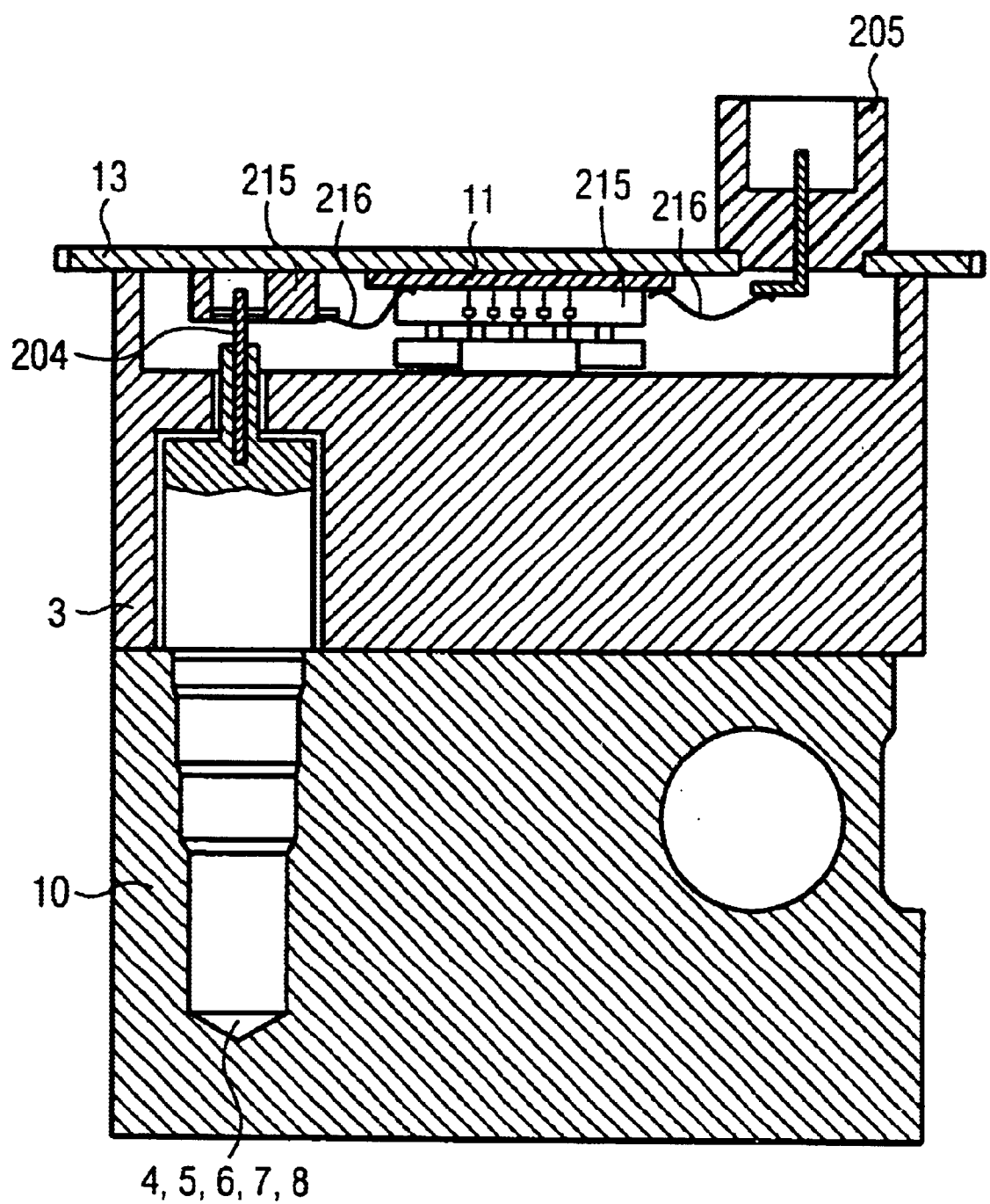
FIG. 20 is a fragmentary, cross-sectional view along a section line XX—XX in FIG. 21.

FIGS. 19 and 20 show an embodiment in which the electronics panel 11, which has been laminated onto the cover 13, is configured as a bondable circuit carrier, e.g., an FR4, a LTCC, or a thick-film ceramic carrier. The transmission and control device components, such as, for example, displacement sensor configuration 201, motor 15 of the pump 14, or solenoid valves 4 to 8, are brought into contact with the control electronics disposed on the electronics panel 11 through bonding strips 215. The bonding strips 215 have plug-connection regions into which the connection elements 204 of the transmission and control device components are fitted. These plug connections may be releasable and unreleasable and may be configured so that they can be plugged together one or more times. The bonding strips 215 are connected in an electrically conductive manner to the electronics panel 11 through bonding wires 216. It is also possible for connection elements 204, e.g., of a plug connector 205, to be bonded directly to the electronics panel (cf. FIG. 20).

FIG. 21 shows a view from below of the control device in accordance with the exemplary embodiment shown in FIGS. 19 and 20. The hydraulics casing 10 with an opening 217 to the transmission chamber can be seen next to the pump 14. The sectional planes illustrated in FIGS. 19 and 20 are indicated by XIX—XIX and XX—XX, respectively.

The various possible configurations, in particular, with regard to the connection techniques and the configuration and integration of the sensor configurations, are often illustrated only in a few figures, but may also be transferred to the other embodiments.

We claim:

1. An electronic-hydraulic control device for a vehicle transmission having a transmission casing with an installation opening, solenoid valves with magnet parts and hydraulic parts, electronics for controlling the solenoid valves, and a pressure medium, the control device comprising:
    a casing having:
        a magnet casing part accommodating the electronics and the magnet parts of the solenoid valves; and
        a hydraulics casing part:
            to be disposed at least partially within the transmission casing;
            to be supplied with the pressure medium;
            accommodating the hydraulic parts of the solenoid valves; and
            to be installed in the installation opening of the transmission casing.

2. The control device according to claim 1, wherein:
    the vehicle transmission has a pump with a motor for pumping the pressure medium; and
    said hydraulics casing part has a shoulder to be attached to the pump and the motor.

3. The control device according to claim 2, wherein:
    said shoulder has opposite sides; and
    the pump and the motor are to be attached to respective ones of said opposite sides.

4. The control device according to claim 2, wherein the pump is disposed within the transmission casing.

5. The control device according to claim 2, wherein the motor projects out of the transmission casing.

6. The control device according to claim 1, wherein the vehicle transmission has a reservoir for holding the pressure medium.

7. The control device according to claim 6, wherein the reservoir is integrated in the control device.

8. The control device according to claim 6, wherein the reservoir is integrated in said casing.

9. The control device according to claim 7, wherein the reservoir is accommodated within said hydraulics casing part.

10. The control device according to claim 7, wherein:
    said casing defines a receiving space;
    the reservoir has a bellows element; and
    the bellows element is accommodated within said receiving space.

11. The control device according to claim 9, wherein:
said hydraulics casing part defines a receiving space;
the reservoir has a bellows element; and
the bellows element is accommodated within said receiving space.

12. The control device according to claim 10, wherein the bellows element is filled with air.

13. The control device according to claim 6, wherein the reservoir has a piston for prestressing the pressure medium.

14. The control device according to claim 13, wherein:
the transmission casing has a spring; and
the spring imparts a force upon the piston.

15. The control device according to claim 2, including a plug connector to be connected to the motor.

16. The control device according to claim 15, wherein said plug connector is to be disposed inside the transmission casing.

17. The control device according to claim 1, including a gear selector disposed within said hydraulics casing part.

18. The control device according to claim 17, wherein said gear selector is to be actuated by at least one of the solenoid valves.

19. The control device according to claim 1, wherein:
the vehicle transmission has shifting sleeves; and
the control device is to be used to hydraulically activate the shifting sleeves.

20. The control device according to claim 19, wherein:
the shifting sleeves each have two pressure chambers; and
a pressure line is connected to each of the two pressure chambers.

21. The control device according to claim 20, wherein:
the vehicle transmission has transmission shafts; and
the pressure line is a bore in a respective one of the transmission shafts.

22. The control device according to claim 20, wherein the vehicle transmission has pistons each accommodated within a respective one of the pressure chambers.

23. The control device according to claim 22, wherein the pistons are identically configured and are disposed mirror-symmetrically with respect to one another.

24. The control device according to claim 22, wherein:
a mating stop is disposed in each of the shifting sleeves; and
the pistons are each assigned the mating stop for defining a limit position.

25. The control device according to claim 22, wherein the vehicle transmission has hydraulically displaceable gearshift shafts.

26. The control device according to claim 25, wherein one of the pistons is positioned on each of the gearshift shafts.

27. The control device according to claim 26, wherein the piston separates a pressure chamber into two partial pressure chambers each separated from one another.

28. The control device according to claim 27, wherein a pressure line opens into each of the two partial pressure chambers.

29. The control device according to claim 26, wherein a stop is assigned to each of the pistons of the gearshift shafts.

30. The control device according to claim 29, wherein the stop is a piston to be acted on by pressure.

31. The control device according to claim 29, wherein the stop is to be displaced into a stop position under action of pressure.

32. The control device according to claim 29, wherein:
the stop has piston surfaces; and
one of the piston surfaces remote from the gearshift shaft is larger than an opposite one of the piston surfaces.

33. The control device according to claim 29, wherein at least one pressure line opens into the pressure chamber accommodating the stop.

34. The control device according to claim 25, wherein:
the vehicle transmission includes a gearshift fork for each of the gearshift shafts; and
each of the gearshift shafts is coupled, through a respective gearshift fork, to the shifting sleeves of the corresponding transmission shafts.

35. The control device according to claim 25, wherein:
the vehicle transmission includes:
actuators;
gate arms; and
gears; and
each of the gearshift shafts is to be rotated about an axis by one of the actuators to select one of the group consisting of a gate arm and a gear.

36. The control device according to claim 35, wherein:
each of the actuators has an outer rotary piston and an inner rotary piston; and
the outer rotary piston and the inner rotary piston rotate to a given extent with respect to one another.

37. The control device according to claim 36, wherein each of the gearshift shafts is connected in a rotationally fixed manner to the inner rotary piston.

38. The control device according to claim 36, wherein each of the gearshift shafts is axially displaceable with respect to the inner rotary piston.

39. The control device according to claim 25, wherein:
the vehicle transmission includes actuating devices each having a gearshift element and a rotary actuator; and
each of the gearshift shafts is to be coupled to a respective gearshift element.

40. The control device according to claim 39, wherein the actuating devices each have a shaft bearing the respective gearshift element and rotating with the respective rotary actuator.

41. The control device according to claim 1, wherein said hydraulics casing part is attached to the transmission casing.

42. The control device according to claim 41, wherein said magnet casing part is formed of a nonconductive material.

43. The control device according to claim 41, including a cover formed of metal connected to the casing.

44. The control device according to claim 43, including an electronics panel attached to the cover.

45. The control device according to claim 1, including a displacement sensor configuration disposed within said magnet casing part.

46. The control device according to claim 1, including a pressure sensor configuration disposed within said magnet casing part.

47. The control device according to claim 40, wherein a pressure sensor configuration is disposed within said magnet casing part.

48. The control device according to claim 1, wherein the vehicle transmission is a motor vehicle transmission.

49. In a vehicle transmission having:
a casing with an installation opening;
solenoid valves with magnet parts and hydraulic parts;
electronics for controlling the solenoid valves; and
a pressure medium,
an electronic-hydraulic control device comprising:

a casing having:
    a magnet casing part accommodating the electronics and the magnet parts of the solenoid valves; and
    a hydraulics casing part:
        disposed at least partially within the transmission casing;
        supplied with the pressure medium;
        accommodating the hydraulic parts of the solenoid valves; and
        installed in the installation opening of the transmission casing.

50. An electronic-hydraulic control assembly for a vehicle transmission, comprising:
    a transmission casing having an installation opening;
    solenoid valves with magnet parts and hydraulic parts;
    electronics for controlling said solenoid valves, said electronics connected to said solenoid valves;
    a reservoir for holding a pressure medium;
    a pump with a motor for pumping the pressure medium; and
    a control casing having:
        a magnet casing part accommodating said electronics and said magnet parts; and
        a hydraulics casing part:
            disposed at least partially within said transmission casing;
            connected to said reservoir for receiving the pressure medium;
            accommodating said hydraulic parts; and
            disposed in said installation opening.

51. The control assembly according to claim 50, wherein said reservoir is integrated in said casing.

52. The control assembly according to claim 50, wherein said reservoir is accommodated within said hydraulics casing part.

53. The control assembly according to claim 50, wherein:
    said hydraulics casing part defines a receiving space;
    said reservoir has a bellows element; and
    said bellows element is accommodated within said receiving space.

54. The control assembly according to claim 53, wherein:
    said reservoir has a reservoir piston for pressurizing the pressure medium;
    said transmission casing has a spring; and
    said spring imparts a force upon said reservoir piston.

55. The control assembly according to claim 50, including a plug connector connected to said motor and disposed inside said transmission casing.

56. The control assembly according to claim 50, including a gear selector disposed within said hydraulics casing part, said solenoid valves connected to and actuating said gear selector.

57. The control assembly according to claim 50, including:
    hydraulically activated shifting sleeves each having two pressure chambers; and
    a pressure line connected to each of said two pressure chambers.

58. The control assembly according to claim 57, including transmission shafts, said pressure line being a bore in a respective one of said transmission shafts.

59. The control assembly according to claim 57, including pistons each accommodated within a respective one of said two pressure chambers.

60. The control assembly according to claim 59, wherein said pistons are identically configured and are disposed mirror-symmetrically with respect to one another.

61. The control assembly according to claim 59, wherein:
    said shifting sleeves each have a mating stop therein; and
    said pistons are each assigned to a respective mating stop for defining a limit position.

62. The control assembly according to claim 59, including hydraulically displaceable gearshift shafts, one of said pistons being positioned on each of said gearshift shafts.

63. The control assembly according to claim 62, wherein each of said pistons separates each of said pressure chambers into two partial pressure chambers each separated from one another.

64. The control assembly according to claim 63, including a pressure line opening into each of said partial pressure chambers.

65. The control assembly according to claim 62, including a stop assigned to each of said pistons of said gearshift shafts, said stop having piston surfaces, one of said piston surfaces remote from said gearshift shafts being larger than an opposite one of said piston surfaces.

66. The control assembly according to claim 65, wherein at least one pressure line opens into said pressure chamber accommodating said stop.

67. The control assembly according to claim 62, including a gearshift fork for each of said gearshift shafts, each of said gearshift shafts being coupled, through said gearshift fork, to said shifting sleeves of said corresponding transmission shafts.

68. The control assembly according to claim 62, including:
    actuators;
    gate arms; and
    gears, each of said gearshift shafts being rotated about an axis by one of said actuators to select one of the group consisting of a gate arm and a gear.

69. The control assembly according to claim 68, wherein:
    each of said actuators has an outer rotary piston and an inner rotary piston; and
    said outer rotary piston and said inner rotary piston rotate to a given extent with respect to one another.

70. The control assembly according to claim 69, wherein each of said gearshift shafts is connected in a rotationally fixed manner to said inner rotary piston.

71. The control assembly according to claim 69, wherein each of said gearshift shafts is axially displaceable with respect to said inner rotary piston.

72. The control assembly according to claim 62, including actuating devices each having:
    a gearshift element;
    a rotary actuator; and
    a shaft;
    each of said gearshift shafts being coupled to a respective gearshift element; and
    said shaft bearing said respective gearshift element and rotating with said rotary actuator.

73. The control device according to claim 50, wherein:
    said hydraulics casing part has a shoulder with opposite sides; and
    said pump and said motor are attached to respective ones of said opposite sides.

* * * * *